Figure 1:
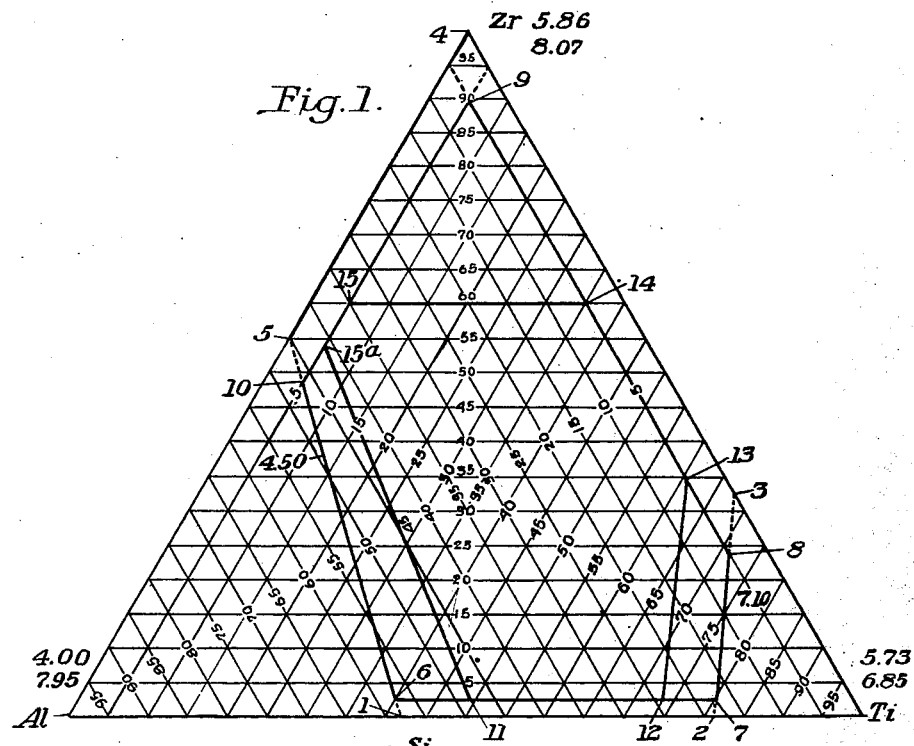

Feb. 27, 1945.  H. T. CHANDLER  2,370,289
TREATMENT OF STEEL OR IRON
Filed July 18, 1940   3 Sheets-Sheet 1

INVENTOR
Henry T. Chandler
by his attorneys
Stebbins and Blenko

Feb. 27, 1945. H. T. CHANDLER 2,370,289
TREATMENT OF STEEL OR IRON
Filed July 18, 1940 3 Sheets-Sheet 2

INVENTOR
Henry T. Chandler

Feb. 27, 1945. H. T. CHANDLER 2,370,289
TREATMENT OF STEEL OR IRON
Filed July 18, 1940 3 Sheets-Sheet 3
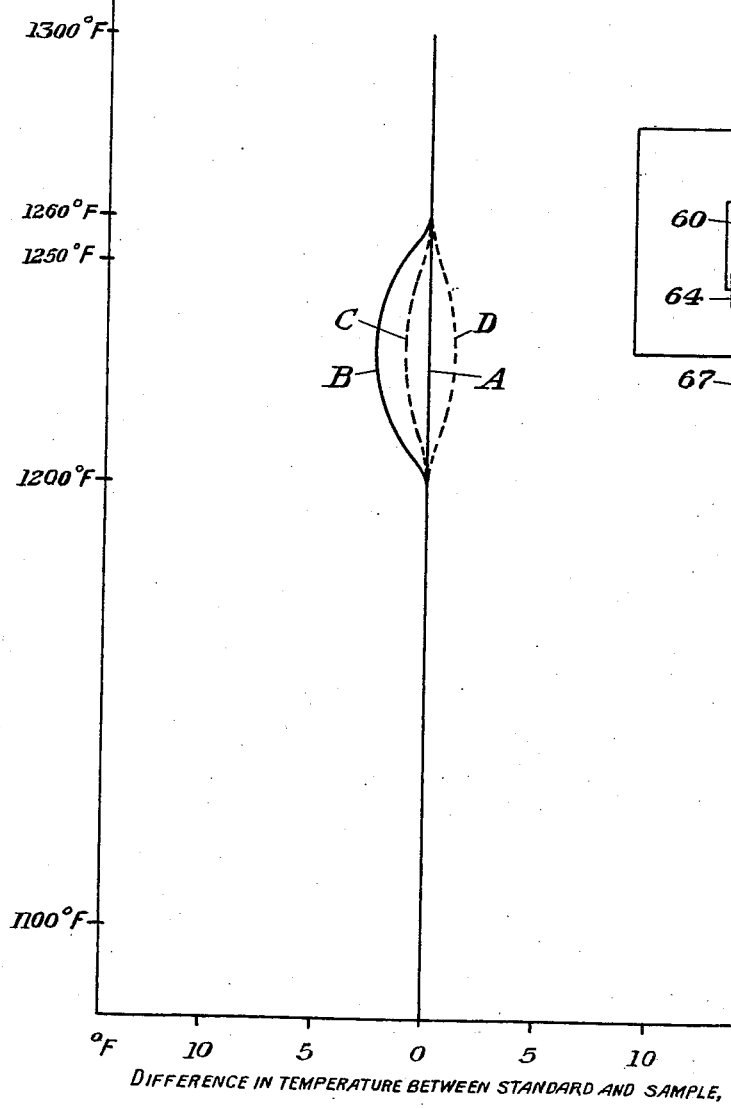
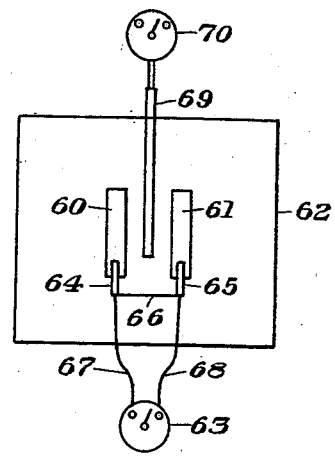
INVENTOR
Henry T. Chandler

UNITED STATES PATENT OFFICE 2,370,289

TREATMENT OF STEEL OR IRON

Henry T. Chandler, New York, N. Y., assignor, by mesne assignments, to Vanadium Corporation of America, New York, N. Y., a corporation of Delaware Application July 18, 1940, Serial No. 346,111

17 Claims. (Cl. 75—45)

This invention relates to the treatment of steel or iron, and to alloys used in such treatment.

It has long been known that the addition of specified amounts of many elements such as manganese, silicon, nickel, chromium, vanadium, molybdenum, uranium, columbium, tungsten, cobalt, copper, zirconium, barium, strontium, aluminum, and others, to a properly prepared steel bath brings about commercially valuable changes in the physical characteristics of the finished steel. Such changes may appear as an increase in the values of toughness, strength, hardness, resistance to fatigue and impact, or other useful engineering property of the steel which defines its suitability for some particular service, or an improvement in those less clearly defined characteristics such as forgeability, machinability, response to heat treatment, etc., which determine the ease of fabrication of the steel from the ingot to the finished part. Largely because of this influence of alloy elements, steel has become a most versatile engineering material. Alloy steels are now regularly made to hundreds of different specifications of widely diverse physical, chemical and electrical properties and suited to a wide variety of structural uses.

For convenience, these auxiliary elements are usually added to the steel in the form of iron alloys, although in some cases, for example, nickel, copper and aluminum, the metals themselves are used. Thus there has appeared on the market a large group of metal products such as ferrosilicon, ferro-chromium, ferro-tungsten, silico-manganese, etc., etc., which are prepared specifically for the purposes of the steel making industry and which are generally referred to as ferro-alloys.

Broadly speaking, the commercial value of these ferro-alloys is based upon two distinct, though related, functions which they perform in modern steel making practice. First, they serve as a convenient means of adding to the base composition of the steel a desired quantity of one or more of the useful steel alloying elements. The presence as a part of the composition of the finished steel, of specified quantities of these added elements has an important influence on the complex equilibrium of the iron-carbon system of the solid steel and because of this, as well as their alloying effect and other reasons, the properties of the finished steel are thereby altered in some desirable manner.

An extensive art has been built up around this use of ferro-alloys and the steels in which they are used are commonly known as "Alloy steels." Such steels are generally classified and named in accordance with the predominating element or elements added. Thus, we have nickel steels, chromium steels, vanadium steels, chromium-vanadium steels, tungsten steels. The ferroalloys produced for making this class of steel may be conveniently called "Addition alloys," inasmuch as the major purpose is for the addition of some alloying element to the composition of the finished steel.

In contrast to this truly alloying effect, the addition of certain elements to a steel bath may also profoundly influence the physical properties of the finished steel in quite another manner.

It is quite commonly known that wide variations in steel quality may result from variations in furnace operation for a steel of a given chemical composition. The molten steel bath, from the time the charge is melted until it is poured and solidified, is the scene of a highly complicated set of physical and chemical reactions between the various elements and their compounds which make up the composition of the steel and which are present either intentionally or as impurities. It is quite to be expected and, it is a fact, that the quality of the finished steel is influenced to an important extent by the nature of these reactions and the degree to which they approach their normal end points. Particularly is this influence manifest by changes in the values of grain size, non-metallic inclusion count, hardenability, impact, as well as those characteristics vaguely described as "body," "sensitivity," etc., and the variability of these and other properties in commercial steel is, in measure, determined by the extent to which these reactions are known and controlled. The behavior of the ever present impurities, oxygen, nitrogen and hydrogen are particularly important to the steel maker and a considerable part of the variations in properties of commercial steels of otherwise similar composition appears to be related to the variable concentration of these elements in the bath as well as the form and nature of their compounds which are present in the finished steel, together with the manner of their distribution.

It is the function of a small group of ferro-alloys to combine with some of these common impurities in steel and by their reaction with these elements either to form stable insoluble compounds with them or in some other manner "deactivate" or "fix" them and thus eliminate or limit their detrimental effects on the properties of the finished material. The reaction products may be removed in the slag or remain behind in the metal as inert inclusions. The common deoxidation of steel by means of aluminum or alloys of manganese, silicon, etc., as well as the effect of ferromanganese additions in "fixing" sulphur in steel, serve as illustrations of this use of ferro-alloys.

The second function of ferro-alloys may, therefore, be considered as a deactivating or scavenging effect and their value in this role is dependent upon both the manner and the extent of their reactions with other elements such as oxygen, nitrogen, hydrogen, sulphur and phosphorus, which elements are necessarily present in the steel bath under the conditions which now prevail in steel making. Ferro-alloys of this type may be conveniently called "reaction" or "process" alloys.

The manufacture and use of ferro-alloys for the steel industry is thus concerned with two separate, though related, arts, i. e., (a) The art of alloying
(b) The art of processing or scavenging In the art of alloying, the addition of an alloying element to the specified composition of the steel is the aim; whereas in the art of processing, the important thing is the reaction of the added elements with the impurities of the steel bath and the effective removal or "deactivation" of some offending element.

The distinction between these two types of ferro-alloys is perhaps more clearly appreciated when we examine the quite different considerations upon which their respective composition specifications and manner of use are based.

Since the purpose of an additional alloy is simply to serve as a means of introducing one or more of its elements into the composition of a steel base, no greater difficulty is experienced in arriving at one or even many specifications of an alloy of the usual steel making elements which will suitably accomplish this aim. In general, it is sufficient that the alloy contain a substantial amount of the desired element, that it be free from impurities in harmful amounts and that its physical characteristics, i. e., specific gravity, melting point and solubility are such that it will be readily absorbed by the molten steel bath. Usually the alloy may be added at any convenient time during the steel making process.

In contrast to this, the setting up of suitable specifications for the composition, manufacture and use of reaction or process alloys, particularly those containing more than one active element, is a problem of a much higher order of complexity. Here since the alloy is to enter into a set of quite complicated physical and chemical reactions with one or more of the constituents of the steel bath and because these reactions must proceed to end points which results in some favorable "fixation" or removal of these constituents, it is evident that their behavior is a problem of physical chemistry.

Specifications for reaction alloys presume the consideration, not only of the energy changes or so-called driving forces of the chemical reactions which take place between the elements of the alloy and the constituents of the bath, and the equilibrium or limiting states towards which these reactions progress but also the solubilities, melting points, viscosities, thermal capacities, crystalline habits, surface tension and colloidal behavior of the slag products of these reactions.

All of the phenomena which we associate with "chemical affinities," "mass action," "reaction rates," "free energy," "equilibrium" and the other terms of thermo-chemistry and thermo-dynamics become important factors in determining the efficiency of the alloy. It is not sufficient that the elements be simply present in the bath; they must also be present in the right form at the right time, and in the proper concentrations, both with respect to each other and with respect to the other elements of the bath.

This subdivision of ferro-alloys into "addition" alloys and "reaction" alloys is not a precise one, inasmuch as certain commercial alloys serve to some degree, both purposes. For example, the value of ferro-manganese to the steel maker is as much for its action on the steel bath in deoxidation and the deactivation or fixing of sulphur as it is for its suitability for supplying the manganese content of manganese steels. However, this classification based, as it is, both upon the function which the alloy serves as well as upon certain distinctive chemical features of the alloy itself, is a natural one from the alloy maker's point of view, and will, I believe, serve a useful purpose in clarifying the nature and objects of my invention.

The alloys of my invention are essentially process or reaction alloys both because their more valuable effects on steel quality are the result of physical and chemical reactions which they bring about in the molten steel bath (and only incidentally the alloy effect of the residual alloy which remains in the steel after treatment), as well as the fact that their effectiveness is, in large measure, a function of certain unusual features of their composition specifications, together with the manner in which they are used.

My alloys are particularly valuable in fixing the limits of that behavior of steel which is influenced by the presence of the gases, oxygen and nitrogen, particularly the latter.

The gases oxygen and nitrogen are present in practically all commercial made steels in quantities which are sufficient to have an important influence on the properties of the steel, particularly those properties which determine the steel's response to mechanical and thermal treatment. They may be present as molecular gas in blowholes or other internal cavities in the steel, in solid solution in the steel, or in the form of non-metallic compounds such as nitrides, oxides or silicates and the like, which may be in solution or exist as inert particles scattered through the steel. The presence of oxygen is believed to affect the solubility of carbon in austenite and ferrite and thereby to influence such properties as strength, hardness, ductility, elastic limit, impact resistance, etc. Nitrogen is also believed to affect the hardness, ductility, tensile strength, elastic limit, impact strength and magnetic properties of steel and to be a cause for many of the phenomena connected with blue brittleness, temper brittleness, age hardness and other allied properties. Also certain phenomena connected with the presence of ghost lines, hair cracks, bands, tendency toward caustic embrittlement, irregularity in carburization and heat treatment and response to nitrogen case hardening (by molten cyanide bath or dry ammonia gas method, etc.) are considerably influenced in one way or another by these gases. It is, therefore, apparent that the presence of oxygen or nitrogen in steel in various quantities and conditions may well be the reason for the fact that steels of otherwise fixed compositions often fail to respond to thermal or mechanical treatment in the manner expected or to develop their anticipated physical characteristics. In many cases this has been proven to be true. The quantity of oxygen and nitrogen present in the steel is, in most instances, not the decisive factor but rather the form in which these elements are combined and the manner of their distribution throughout the steel, i. e., whether they exist as active soluble bodies or as inert insoluble compounds.

In view of these facts, the control of the action of oxygen and nitrogen is a matter of considerable importance to the steel maker. Particularly is this true in the manufacture of those grades of steel where uniformity of quality is of great importance, as is commonly the case in steels for automotive and other machine parts made in mass production.

From a consideration of the chemical and physical nature of nitrogen and oxygen, as well as the manner by which these gases become incorporated in the steel bath, it follows that their removal or control presents a somewhat different problem than does that of the other common variable elements of steel. The holding within limits of the carbon, silicon, manganese, sulphur and phosphorus content of a steel may be accomplished by comparatively direct methods. It is quite practical and, in fact, common practice to determine (e. g. by means of a rapid chemical analysis) the amounts in which these elements occur in the steel at some convenient time and while the bath is held molten. The amounts of the respective elements are then brought within their desired specification limits by means of additions to the bath or by further refinement before the steel is poured into molds.

In the case of oxygen and nitrogen, this direct method is not commercially practical. There has not been developed as yet a suitable method of chemical analysis which will determine both the amount and the condition of these gases in the steel with sufficient rapidity and accuracy to be of use before the steel is cast.

In general, this problem has been met by indirect methods. With the help of careful choice of raw materials and the precise following of details of procedure from the time the charge is placed in the furnace until the ingots have been solidified, the steelmaker strives to bring his product to a more or less fixed and known state of deoxidation and denitrogenation and thereby produce a steel in which the variations in the form and amount of oxygen and nitrogen are held within adequate limits.

In the case of oxygen, his efforts are facilitated by proper slag manipulation and the use of various commercial deoxidizers such as aluminum, aluminum-silicon, silico-manganese and the like alloys. With nitrogen, however, no convenient method has been developed for changing either the amount or the form in which it occurs in steel after the steel has reached the ladle. Even with the greatest care and closest supervision possible to steel making conditions, variations occur in the form and amounts of oxygen and nitrogen to a sufficient extent to produce undesirable and unpredictable changes in steel properties, so that often in the case of steels which are to be made to close specification limits more than one heat must be made before the physical property specification requirements of the steel are met, thereby adding considerably to the cost of production.

I have found that by the addition of controlled amounts of ferro or other alloys of certain predetermined characteristics to a suitably prepared steel bath, as will be hereinafter described, I am able to control and limit the variability in those properties of a steel, which variability is caused by or at least associated with variations in the form and quantity of the nitrogen and oxygen in the steel.

My invention has two general objects: First, the production of steels having greater uniformity from heat to heat in physical properties and particularly those properties which determine the steels' response to the mechanical and thermal treatments required in the production of finished articles, which greater uniformity is obtained at a less cost than by methods heretofore known. Second, the production of steels which possess, after suitable heat treatment, physical properties and combinations of properties of a relatively high order as compared with the best practice in steels of similar base composition. In these new steels, the usual tensile properties are not only in themselves of a high order but there may be associated with them, after suitable heat treatment, other characteristics such as high toughness values at low temperature, i. e., 25 to 125° F. below zero, adaptability to nitrogen case hardening, desirable magnetic and electrical characteristics, greatly increased hardenability and other useful properties, as will be described later, which are of value.

I accomplish both of these objects by adding to the steel bath, under suitable conditions, an alloy which will combine with and render inactive at least a part of the nitrogen and oxygen of the steel.

The efficacy with which any element combines with any other element under a given set of conditions may be evaluated from the "equilibrium constant," which constant can be determined either by means of actual measurement or from free energy and entropy equations of the specific reactions involved. These equations employ many constants and factors which, as yet, have not been determined for the complex conditions which occur in steel making.

Because of this and the fact that the reactions which occur in steel are, themselves, in many cases unknown, the method of exact calculation is not generally possible. Nor is the method of direct measurement practical. The problem becomes very difficult indeed when there is more than one active element and particularly when these elements are added in the form of an alloy. I have found that I am able, by means of easily derived equations and known chemical data, to arrive at constants which are related to and which will permit me to predict, within certain practical limits, the behavior of the alloys of my invention with respect to their reactions with oxygen and nitrogen in steel. The method of derivation of these constants will be more clearly understood with reference to the following tables.

TABLE I

| Metal | | Oxide Me$_m$O$_n$ | Q$^O$ Heat of oxide formation per mol Me$_m$O$_n$ Kg. Cal. mol | Oxygen equivalent of metal (grams oxygen per 1 gram metal) $K = \frac{16 \cdot n}{Me \cdot m}$ | Heat of oxide formation per 1 gram oxygen $h^O = \frac{Q^O}{16 \cdot n}$ Kg. Cal. g$^{-1}$ |
|---|---|---|---|---|---|
| Symbol | Atomic weight | | | | |
| (1) | (2) | (3) | (4) | (5) | (6) |
| Ca | 40.1 | CaO | 152 | 0.399 | 9.49 |
| Mg | 24.3 | MgO | 146.1 | 0.658 | 9.13 |
| Sr | 87.6 | SrO | 140.8 | 0.183 | 8.80 |
| Ba | 137.4 | BaO | 133 | 0.116 | 8.32 |
| Zr | 91.2 | ZrO$_2$ | 258.1 | 0.351 | 8.07 |
| U | 238.1 | UO$_2$ | 256.6 | 0.134 | 8.01 |
| Al | 27.0 | Al$_2$O$_3$ | 381 | 0.889 | 7.95 |
| Ta | 180.9 | Ta$_2$O$_3$ | 379 | 0.133 | 7.90 |
| Cb | 92.9 | Cb$_2$O$_3$ | 365 | 0.258 | 7.60 |
| V | 51.0 | V$_2$O$_3$ | 350 | 0.471 | 7.30 |
| Ti | 47.9 | TiO$_2$ | 219 | 0.668 | 6.85 |
| Si | 28.1 | SiO$_2$ | 200 | 1.140 | 6.25 |
| Mn | 54.9 | MnO | 96.5 | 0.291 | 6.03 |
| Cr | 52.0 | Cr$_2$O$_3$ | 273 | 0.462 | 5.69 |
| B | 10.8 | B$_2$O$_3$ | 280 | 2.220 | 5.83 |
| Mo | 96.0 | MoO$_2$ | 131 | 0.333 | 4.09 |
| W | 184.0 | WO$_2$ | 128 | 0.174 | 4.00 |
| Fe | 55.8 | FeO | 65 | 0.287 | 4.06 |

TABLE II

| Metal | | Nitride Me$_x$N$_y$ | Melt. pt., °C. | Q$^N$ Heat of nitride formation per mol Me$_x$N$_y$ Kg. Cal. mol$^{-1}$ | Nitrogen equivalent of metal (grms. nitrogen per gr. metal) $l = \frac{14 \cdot y}{Me \cdot x}$ | Heat of nitride formation per 1 gram nitrogen $h^N = \frac{Q^N}{14 \cdot y}$ Kg. Cal. g$^{-1}$ |
|---|---|---|---|---|---|---|
| Symbol | Atomic weight | | | | | |
| (1) | (2) | (3) | (4) | (5) | (6) | (7) |
| Zr | 91.2 | ZrN | 2,980 | 82.2 | 0.154 | 5.86 |
| Ti | 47.9 | TiN | 2,950 | 80.3 | 0.292 | 5.73 |
| U | 238.1 | U$_3$N$_4$ | | 274 | 0.078 | 4.90 |
| V | 51.0 | VN | 2,050–2,320 | 60 | 0.275 | 4.28 |
| Cb | 92.9 | CbN | | 59 | 0.151 | 4.22 |
| Ta | 180.9 | TaN | | 59.2 | 0.077 | 4.23 |
| Mg | 24.3 | Mg$_3$N$_2$ | d | 117.5 | 0.384 | 4.20 |
| Al | 27.0 | AlN | 2,150 | 56 | 0.518 | 4.00 |
| Ca | 40.1 | Ca$_3$N$_2$ | 900 | 110 | 0.233 | 3.93 |
| Sr | 87.6 | Sr$_3$N$_2$ | | 93 | 0.107 | 3.32 |
| Ba | 137.4 | Ba$_3$N$_2$ | | 88 | 0.068 | 3.15 |
| Si | 28.1 | Si$_3$N$_4$ | 1,900 | 170 | 0.665 | 3.03 |
| B | 10.8 | BN | | 31.5 | 1.295 | 2.25 |
| Cr | 52.0 | CrN | | 29.8 | 0.269 | 2.13 |
| Mn | 54.9 | Mn$_3$N$_2$ | | 57.8 | 0.102 | 2.07 |
| Fe | 55.8 | Fe$_4$N | | 2.6 | 0.063 | 0.19 |

Referring to Table I, column 1 lists various elements which have a strong affinity for oxygen and which have been used to a greater or less extent in the deoxidation of steel. Column 2 gives the atomic weight of these elements, column 3 the oxide which I believe to be formed from the element under the conditions existing in molten steel. Column 4 gives the heat of oxide formation in kilogram calories per gram molecule of metallic oxide. This is designated as the $Q^O$ value. Column 5 gives the oxygen equivalent of metal, that is the weight in grams of oxygen that can react with one gram of metal. Column 6 gives the heat of oxide formation per one gram of oxygen. It is designated by $h^O$.

The meaning and manner of obtaining these values will be apparent from the following: Let us assume that it is desired to combine oxygen with zirconium. The reaction may be represented by the following equation:

$$Zr + O_2 = ZrO_2 + 258.1 \text{ kg. cal.}$$

This is an exothermic reaction. The figure of 258.1 kg. cal. is shown in column 4 in the line representing the reaction between zirconium and oxygen.

The $k$ value given in column 5 (oxygen equivalent) is derived as follows: It is evident that according to the above equation, 91.2 grams of zirconium will react with 2×16 or 32 grams of oxygen to produce 123.2 grams of ZrO$_2$. Therefore, one gram of zirconium will react with 32:91.2=0.351 gram of oxygen. In other words, the oxygen equivalent ($k$) is equal to $$\frac{16 \cdot n}{Me \cdot m}$$

in which $n$ is the number of atoms of oxygen which combine with the metal to form the metal oxide and $m$ represents the number of atoms of the metal which react with the oxygen to form the metallic oxide.

The heat of oxide formation ($h^O$) is derived as follows: From the above equation, it is evident that the reaction between 91.2 grams of zirconium and 16×2 grams of oxygen to form 123.2 grams of ZrO$_2$ liberated 258.1 kg. cal. Therefore, the kg. cal. liberated by reaction of one gram of oxygen is 258.1÷32=8.07. The $h^O$ is, therefore, equal to $$\frac{Q^O}{16 \times n}$$

in which $n$ is the number of atoms of oxygen which combine with the metal to form the metal oxide.

The other values given in this table are obtained in a similar manner. Likewise the values given in Table II refer to the reaction between the various metals and nitrogen to form the nitrides and are derived in a similar manner.

It will be observed that the figures listed under the columns "Oxygen equivalent" and "Nitrogen equivalent" are capacity figures—that is, they represent the amount of oxygen or nitrogen which would be involved in a reaction with a fixed amount of metal. In contrast, the figure in column 6, "Heat of oxide formation" or "Heat of nitride formation," might be called an intensity factor—that is, they are related to the energy liberated under the conditions given and are to that extent a measure of the intensity of the reaction. It will be noted that in these tables the elements have been listed in the order of decreasing heat of oxide formations and heat of nitride formations and this is in accordance with their observed performance for fixing oxygen and nitrogen in steel. Thus calcium has a higher heat of oxide formation than magnesium or any of the other metals listed below it and it is an observed fact that calcium is a more powerful deoxidizer than any of the other metals listed. The tables, therefore, show the relative effectiveness of the various elements in combining with oxygen and nitrogen.

The figures from which the oxygen equivalent and the heat of oxide formation are calculated are from standard tables giving the values obtained under the usual standard conditions. They are, therefore, not entirely accurate for the somewhat different conditions which exist in molten steel and for complete accuracy the values would be somewhat different. However, since the use I make of them is more qualitative than quantitative, the exact values which would obtain under actual steel making conditions need not be used but the values as they appear in the tables can be satisfactorily used. For the purposes of the present invention, I am interested more in the relative values than in the absolute values and the values in the tables are satisfactory for the use I make of them.

It will be observed that the tables give the values obtained upon reaction of single elements with oxygen and nitrogen. The use of a single element, however, has some practical disadvantages. For example, magnesium or calcium metal have excellent deoxidizing characteristics and will deoxide steel to an extraordinary extent. But it is impractical to use these single elements under the conditions with which the steel maker is faced.

They are so light that they tend to float on the metal or on the slag and are so reactive that the major part of the addition burns in the air or combines with the slag rather than reacting with the oxygen in the metal. The same objection is also true to some extent in the case of aluminum. Also when aluminum alone is added to a steel bath, its reaction products are in finely divided form and as the amount of aluminum added is increased, the size of the reaction product particle decreases and true suspensions approaching the colloidal may be formed in the steel if the steel is treated with an excess of metallic aluminum. This behavior of aluminum, which is also the case with titanium and some other single elements is detrimental to some of the properties of the steel.

Therefore, in practicing the present invention I prefer to use one or more alloys containing more than one active element, thereby not only attaining a high degree of chemical effectiveness but at the same time overcoming many of the practical objections which exist in the case where single elements are used.

It will be noted from the Tables I and II that the elements do not have the same order of effectiveness for combining with nitrogen as for combining with oxygen and that one element may be excellent for one purpose and not very effective for another purpose. Since the usual steel baths contain both oxygen and nitrogen, and since the manner in which both these elements are introduced into steel and removed from steel are interrelated, the reaction alloys of my invention contain elements which are effective for the fixation of both these elements. Among the preferred elements are zirconium, titanium, uranium, aluminum, magnesium, calicium, barium, strontium and vanadium. Since it is an important function of my alloy to combine with and deactivate the nitrogen in steel, it is essential that it contain an element or elements suited to do this to a high degree. Such elements, for example, are zirconium, titanium and uranium. Further, since the removal of nitrogen and oxygen are closely related, I also employ an element or elements having strong affinity for oxygen, such elements being, for example, the alkaline earth metals calcium, barium and strontium, and magnesium and aluminum.

My reaction alloy always contains zirconium or titanium or uranium or a combination of these elements, because of their nitrogen fixing characteristics. In addition to the nitrogen fixing elements, it is preferable that the alloy contain one or more elements which have a greater affinity for oxygen than have the titanium, zirconium or uranium. The preferred elements for combining with oxygen are calcium, barium, strontium, magnesium and aluminum. Where the alloy contains both titanium and zirconium or both titanium and uranium, the zirconium or uranium, since they have higher heats of oxide formation than titanium may be used in place of or in addition to the calcium, barium, strontium, magnesium or aluminum. Although it is possible to accomplish the removal of oxygen by the use of a separate deoxidizer, it is preferable that the reaction alloy of my invention contain both a nitrogen fixing element and an oxygen fixing element.

It appears that the deactivation of nitrogen in the steel is facilitated by including in the reaction alloy one or more carbide forming elements, such as vanadium, uranium, tungsten, molybdenum or to a lesser extent chromium. As will be explained more fully later on, the alloy preferably also contains other ingredients which give it suitable specific gravity, solubility, melting point, physical form and other desirable properties.

To recapitulate, my reaction alloy has two types of elements:

1. Active elements
2. Auxiliary elements

The active elements are those which combine with oxygen or nitrogen or both oxygen and nitrogen, under the conditions prevailing in a steel bath to form stable non-reactive products. The preferred active elements are titanium, zirconium, aluminum, magnesium, calcium, barium and strontium.

The auxiliary elements are not indispensable but they are useful either in imparting certain desirable properties to the alloy or rendering the process of manufacture of the alloy easier or are necessarily present under the commercial conditions of manufacture. The auxiliary elements are of three classes—i. e.:

(a) Carrier elements
(b) Modifying elements
(c) Subversive elements

The function of the carrier element or elements is to serve as a vehicle for introducing the active elements into the bath to be treated. The usual carrier element is iron, although I may use nickel, copper, cobalt, manganese or other suitable metal which does not materially interfere with the reactions of the active elements.

In general, the modifying elements are used to assist in giving the alloy suitable specific gravity, melting point, solubility and other essential physical properties which facilitate its manufacture or use or which further improve the form, size or distribution of the reaction products. They may also protect the active elements in their function of deactivating nitrogen and oxygen. The preferred modifying elements are tantalum, tungsten and molybdenum. Manganese is also a desirable modifying element in increasing the effectiveness of the alloy particularly where the alloy contains substantial amounts of carbon and/or silicon. It is generally used in amounts of the order of 5 to 20%.

The subversive elements are those which render the alloy less active but which are present to a greater or less extent, due to the process of manufacture of the alloy or to the ingredients employed. The effect of these undesirable elements will be described more in detail hereinafter.

I have previously described how the heat of oxide formation, the oxygen equivalent, the heat of nitride formation and the nitrogen equivalent are obtained when only a single element reacts, and I have stated that these figures may be used as a measure of the ability of the elements to react with oxygen and nitrogen. I have also stated that the reaction alloys of the present invention preferably contain several elements for reacting with the oxygen or nitrogen rather than a single element. I have observed that the action of an alloy of two or more elements which will react with oxygen and nitrogen under the conditions prevailing in a steel bath is different than if these elements were added separately.

Although the chemical reactions included in using an alloy of several elements are very complex, I may, however, by a simple calculation arrive at figures which I have found to be adequate criteria for determining the chemical suitability or unsuitability of the alloy as a reaction alloy for treating steel in accordance with this invention. These figures are the average heat of oxide formation, average heat of nitride formation, the oxygen equivalent and the nitrogen equivalent when such figures are calculated on the basis of the percentages of active elements in their active form. The average heat of oxide formation and average heat of nitride formation of an alloy containing more than one active element may be calculated as follows:

The alloy is characterized by four figures, two for each of both deoxidation and denitrogenation, and are $O_{100}$ and $N_{100}$, which are the oxygen and nitrogen equivalents respectively, and $H_1^o$ and $H_1^n$, which are the average heat of oxide and nitride formation respectively:

(A) $O_{100}$ and $N_{100}$, oxygen (nitrogen) equivalent, in grams, of the active metals in 100 grams of the alloy. These figures are calculated from the equations:

(1) $O_{100} = k_I.(Me_I) + k_{II}.(Me_{II}) + k_{III}.(Me_{III}) + \ldots$
$k_I = \frac{16.n_I}{Me_I.m_I}; \quad k_{II} = \frac{16.n_{II}}{Me_{II}.m_{II}}; \quad k_{III} = \frac{16.n_{III}}{Me_{III}.m_{III}}$ (2) $N_{100} = l_I.(Me_I) + l_{II}.(Me_{II}) + l_{III}.(Me_{III}) + \ldots$
$l_I = \frac{14.y_I}{Me_I.x_I}; \quad l_{II} = \frac{14.y_{II}}{Me_{II}.x_{II}}; \quad l_{III} = \frac{14.y_{III}}{Me_{III}.x_{III}}$ $m_I, m_{II}, m_{III}, \ldots$, and $n_I, n_{II}, n_{III}, \ldots$ ($x_I, x_{II}, x_{III}, \ldots$, and $y_I, y_{II}, y_{III}, \ldots$) are the number of metal atoms and oxygen (nitrogen) atoms, respectively, in one molecule $Me_mO_n$ ($Me_xN_y$) of the oxides (nitrides), formed in deoxidation (denitrogenation), of the active metals I, II, III, ... of the alloy.

$Me_I, Me_{II}, Me_{III}$ in the equations showing the values of $k_I, k_{II}$ and $k_{III}, \ldots$ represent the atomic weights of the active metals, $(Me_I), (Me_{II}), (Me_{III})$ in Equations 1 to 6, ... represent their percentages in the alloy.

(B) $H_1^O$ and $H_1^N$ the average heat, in kg. calories, of oxide (nitride) formation for 1 gram of oxygen (nitrogen), (whereby all active metals are assumed to take part simultaneously and in the proportion in which they are contained in the alloy)

$H_1^O$ (and $H_1^N$) is obtained by dividing $H_{100}^O$ ($H_{100}^N$), which represents the total of heats, developed when each of the active metals in 100 grams of the alloy forms its oxide (nitride), by $O_{100}$ ($N_{100}$):

(3) $H_{100}^O = k_I.h_I^O.(Me_I) + k_{II}.h_{II}^O.(Me_{II}) +$ $k_{III}.h_{III}^O.(Me_{III}) + \ldots \quad h_I^O = \frac{Q_I^O}{n_I.16};$ $h_{II}^O = \frac{Q_{II}^O}{n_{II}.16}; \quad h_{III}^O = \ldots$ (4) $H_{100}^N = l_I.h_I^N.(Me_I) + l_{II}.h_{II}^N.(Me_{II}) +$ $l_{III}.h_{III}^N.(Me_{III}) + \ldots \quad h_I^N = \frac{Q_I^N}{y_I.14};$ $h_{II}^N = \frac{Q_{II}^N}{y_{II}.14}; \quad h_{III}^N = \ldots$ In these equations, $Q_I^O, Q_{II}^O, Q_{III}^O \ldots$
$(Q_I^N, Q_{II}^N, Q_{III}^N \ldots)$ are the molecular heats of formation of the oxides ($Me_mO_n$)
(Nitrides $Me_xN_y$), as found in the literature and given in the table.
The "heat factors" become:

(5) $H_1^O = \frac{H_{100}^O}{O_{100}} =$ $\frac{k_I.h_I^O.(Me_I) + k_{II}.h_{II}^O.(Me_{II}) + k_{III}.h_{III}^O.(Me_{III}) + \ldots}{k_I.(Me_I) + k_{II}.(Me_{II}) + k_{III}.(Me_{III}) + \ldots}$ (6) $H_1^N = \frac{H_{100}^N}{N_{100}} =$ $\frac{l_I.h_I^N.(Me_I) + l_{II}.h_{II}^N.(Me_{II}) + l_{III}.h_{III}^N.(Me_{III}) + \ldots}{l_I.(Me_I) + l_{II}.(Me_{II}) + l_{III}.(Me_{III}) + \ldots}$ Applying this general formula to a specific alloy, let us assume that the composition of the alloy is 20% titanium, 20% aluminum, 7% zirconium, 2.9% silicon, balance essentially iron. Substituting the numerical values in Equation 1 to determine the oxygen equivalent, we have:

EQUATION 1A $$k_{Ti} = \frac{16 \times 2}{47.9} = 0.668; \quad k_{Al} = \frac{16 \times 3}{27.0 \times 2} = 0.888;$$

$$k_{Zr} = \frac{16 \times 2}{91.2} = 0.351; \quad k_{Si} = \frac{16 \times 2}{28.1} = 1.140$$

$O_{100} = 0.668 \times 20 + 0.888 \times 20 + 0.351 \times 7 + 1.140 \times 2.9$ which calculates to the value 36.9.

Substituting numerical values in Equation 2 to determine the nitrogen equivalent, we have:

EQUATION 2A $$l_{Ti} = \frac{14}{47.9} = 0.292; \quad l_{Al} = \frac{14}{27.0} = 0.518;$$

$$l_{Zr} = \frac{14}{91.2} = 0.154; \quad l_{Si} = \frac{14 \times 4}{28.1 \times 3} = 0.665$$

$N_{100} = 0.292 \times 20 + 0.518 \times 20 + 0.154 \times 7 + 0.665 \times 2.9$ which gives a value of 19.2.

Substituting the numerical values in Equation 3, we have the heat of oxide formation in kg. cal. per 100 grams of the alloy, giving a value of 273.0 kg. cal.

EQUATION 3a $$h_{Ti}^O = \frac{219}{2 \times 16} = 6.85; \quad h_{Al} = \frac{381}{3 \times 16} = 7.95$$

$$h_{Zr} = \frac{258.1}{2 \times 16} = 8.07; \quad h_{Si} = \frac{200}{2 \times 16} = 6.25$$

$H_{100}^O = 0.668 \times 6.85 \times 20 + 0.888 \times 7.95 \times 20 + 0.351 \times 8.07 \times 7 + 1.140 \times 6.25 \times 2.9 = 273.0$ kg. cal.

Substituting the numerical values in Equation 4, we have the heat of nitride formation in kg. cal. per 100 grams of the alloy, giving a value of 87.0 kg. cal.

EQUATION 4a $$h_{Ti}^N = \frac{80.3}{14} = 5.73; \quad h_{Al}^N = \frac{56}{14} = 4.00$$

$$h_{Zr}^N = \frac{82.2}{14} = 5.86; \quad h_{Si}^N = \frac{170}{4 \times 14} = 3.03$$

$H_{100}^N = 0.292 \times 5.73 \times 20 + 0.518 \times 4.00 \times 20 + 0.154 \times 5.86 \times 7 + 0.665 \times 3.03 \times 2.9 = 87.0$ kg. cal.

Substituting the numerical values in Equation 5, we have the heat of oxide formation in kg. cal. per gram of oxygen 7.39 kg. cal.

EQUATION 5a $$H_1^O = \frac{H_{100}^O}{O_{100}} = \frac{273.0}{36.9} = 7.39 \text{ kg. cal.}$$

Substituting the numerical values in Equation 6 to determine the average heat of nitride formation, we have Equation 6a, giving a value of 4.53 kg. cal.

EQUATION 6a $$H_1^N = \frac{H_{100}^N}{N_{100}} = \frac{87.0}{19.2} = 4.53 \text{ kg. cal.}$$

These four figures, together with other information, as will be explained, may be used within limits to predict the behavior of the alloy when added to steel for the purpose of deoxidation and denitrogenation.

I have said that in the calculation of the average heat of oxide and nitride formation and the oxygen and nitrogen equivalent, the figures are calculated on the basis of the percentages of the active elements. By this I mean we consider those elements as active which will react with either oxygen or nitrogen under the conditions prevailing in the steel. Thus, although not limited to such elements, all elements having a value over 6.0 kg. cal. per gram of oxygen removed or a heat of nitride formation of 4.0 or over as listed in Tables I and II are always considered as active elements. The following elements are, therefore, to be considered always as active elements: calcium, magnesium, strontium, barium, zirconium, uranium, aluminum, tantalum, titanium, silicon and boron. Manganese may or may not be an active element depending upon the condition of the steel to which the reaction alloy is added and upon the concentration of manganese in the reaction alloy. In general, manganese is not to be calculated as an active element.

Special consideration must be given to the elements carbon and silicon, inasmuch as they may form stable compounds, i. e., carbides and silicides with some of the active elements (titanium, zirconium, calcium, barium, strontium) of a higher order of stability than the other alloy combinations which may be formed between the active elements. My alloy does not contain over 5% carbon. It is preferred that carbon be not over 2% or better still, not over 1%.

As pointed out previously, in arriving at the average heats of oxide formation and nitride formation of an alloy, I consider only that portion of each active element which is in active form. I shall now discuss what is meant by active form. I have pointed out that the formulae are valuable because the figures obtained from them are related to the energy available in the alloy and which determines the driving force with which the alloy will combine with oxygen and nitrogen. From the point of view of available energy, the ultimate analysis of an alloy of several active constituents is not a true indication of the effectiveness of the alloy in removing oxygen and nitrogen. There must be taken into consideration the form in which the elements of the alloy exist and particularly the possibility of compounds existing between the different elements of the alloy which may greatly influence the amount of available energy. For example, if carbon is present in an alloy containing titanium, such carbon will generally be combined with the titanium as titanium carbide and an alloy in which the titanium exists as titanium carbide has been found to act with less efficiency in the removal of oxygen and nitrogen than would an alloy having the same amount of titanium in uncombined form. In a similar manner, silicon combines with, for example, any of the strongly basic elements such as calcium, barium, strontium, sodium and potassium to form silicides. I have found that an alloy in which the calcium exists as calcium silicide is less effective in the removal of oxygen from steel than when the calcium exists in uncombined form. Neither titanium carbide nor calcium silicide are subversive of the reaction characteristics of the alloy. In fact, they are helpful but are not as effective as the titanium and calcium. The following examples will illustrate further what is meant by the portion of each active element which is in active form. In Example A, the alloy contains:

| | Per cent |
|---|---|
| Zirconium | 15 |
| Titanium | 20 |
| Aluminum | 10 |
| Calcium | 4 |
| Silicon | 8 |
| Carbon | 4 |

Balance any one or more of iron, nickel, copper, cobalt or manganese.

The active elements in this alloy are zirconium, titanium, aluminum, calcium and silicon, since each of them has a heat of oxide formation of 6.0 or over or a heat of nitride formation of 4.0 or over. In calculating the heat of oxide formation and heat of nitride formation, however, we do not take the full percentages of all of the elements, because certain portions of these elements have been converted into less active form. The 4% of carbon in the alloy may be combined with approximately 16% of titanium to form titanium carbide, thereby leaving approximately 4% of active titanium. The 4% of calcium may be combined with about 5.6% of silicon to form calcium silicide ($CaSi_2$), leaving about 2.4% of silicon in active form. Accordingly the percentages of active elements of the alloy which are in active form are:

| | Per cent |
|---|---|
| Zirconium | 15 |
| Titanium | 4 |
| Aluminum | 10 |
| Silicon | 2.4 |

These are the values which are used in Formulae 1, 2, 5 and 6 in determining the oxygen and nitrogen equivalents and the heats of oxide and nitride formation and the values expressed in the claims are determined in the manner described.

Consider as another example a reaction alloy as follows:

EXAMPLE B

| | Per cent |
|---|---|
| Zirconium | 15 |
| Titanium | 20 |
| Aluminum | 10 |
| Silicon | 8 |
| Carbon | 4 |

Balance any one or more of iron, nickel, copper, cobalt or manganese.

It will be noted that reaction alloy B is similar to reaction alloy A, except that alloy B does not contain calcium.

Considering now alloy B, the 4% of carbon may be combined with about 16% of titanium to form titanium carbide, leaving in the alloy about 4% of titanium in active form. The percentages of active elements which are in active form accordingly are:

| | Per cent |
|---|---|
| Zirconium | 15 |
| Titanium | 4 |
| Aluminum | 10 |
| Silicon | 8 |

These are the percentages which are used in the formulae above referred to.

In arriving at the percentages of active elements in active form in an alloy, the carbon must always be taken into consideration, since, as pointed out above, it will form carbide with titanium. Carbon will also form zirconium carbide, as well as carbides with vanadium, molybdenum, tungsten and other strong carbide forming elements, but in the above examples we have assumed that it forms only titanium carbide.

As pointed out in connection with Example A, calcium and silicon will form calcium silicide. Likewise silicon will react to form the silicides of barium and strontium. Therefore, if the reaction alloy contains silicon and any strongly basic element such as calcium, barium, strontium, sodium or potassium, we assume for purposes of calculation that the alloy contains the silicides of these elements and the silicon in active form is calculated as described for Example A. It will be noted, however, that in Example B the alloy does not contain any strongly basic element and, therefore, all of the silicon is considered to be in active form.

Below is given Table III, which gives the chemical compositions of four alloys, the heat of nitride formation, the nitrogen equivalent, the

TABLE III

| | V | Ti | Al | Zr | Si | N 100 G. alloy | Kg. Cal. GM N | O 100 G A | Kg. Cal. Gm O |
|---|---|---|---|---|---|---|---|---|---|
| Alloy I | 25.1 | 18.2 | 9.3 | | 2.8 | 18.9 | 4.50 | 35.5 | 7.19 |
| Alloy II | 17.1 | 15.6 | 10 | 2.6 | 3.3 | 17 | 4.46 | 32 | 7.22 |
| Alloy III | 13.6 | 21.5 | 10.7 | | 3.2 | 17.6 | 4.56 | 33.9 | 7.17 |
| Alloy IV | | 20 | 20 | 7.07 | 2.90 | 19.26 | 4.53 | 37.1 | 7.38 | heat of oxide formation and oxygen equivalent calculated according to the method described.

It will be seen that the alloys are all similar with respect to the heats of oxide and nitride formation, as well as their oxygen and nitrogen equivalents, although they are of widely different chemical composition.

It will be noted from this table that the heats of oxide formation and nitride formation (which are measures of the intensity of deoxidation and nitrogen deactivation respectively), and the oxygen and nitrogen equivalent (which are a measure of the capacity of the alloy for deoxidizing and denitrogenizing) are very closely of the same order and, therefore, the alloys can be considered as interchangeable weight for weight. Each of these four alloys was used to treat the same base steel according to this invention, using in each instance four pounds of alloy per ton of steel treated. The alloy was added to the stream while pouring from the ladle into the ingot mold.

The untreated base steel had the following composition:

| | Per cent |
|---|---|
| Carbon | .41 |
| Manganese | 1.75 |
| Vanadium | None |
| Silicon | 0.23 |
| Phosphorus | .029 |
| Sulphur | .018 |
| Aluminum | .026 |
| Active nitrogen | .0062 |

The chemical analyses of the various ingots after treatment with the different reaction alloys were:

|  | Ingot | | | |
|---|---|---|---|---|
|  | 1 | 2 | 3 | 4 |
| Carbon | .42 | .42 | .42 | .42 |
| Manganese | 1.78 | 1.77 | 1.76 | 1.76 |
| Vanadium | .043 | .029 | .025 | None |
| Titanium | .034 | .024 | 0.40 | .040 |
| Aluminum | .049 | .058 | .053 | 0.71 |
| Active nitrogen | .0015 | .0016 | .0017 | .0007 |

The silicon, phosphorus and sulphur were substantially the same as in the untreated steel.

The figures given for "Active nitrogen" represent that part of the nitrogen which is soluble in the steel (for example iron nitride and silicon nitride) and which goes into solution and appears in the filtrate when the steel sample to be analyzed is dissolved in dilute hydrochloric acid. The concentration of the acid used in preparing the steel for active nitrogen analysis should be such that the nitrides relatively insoluble in steel and which exist as small inert particles in the form of inclusions (e. g. titanium nitride and zirconium nitride) are not attacked and appear as a residue.

An example of a method of determining the active nitrogen content of a steel is as follows: 20 gms. of sample were placed in a 400 ml. beaker and 50 ml. of water added. Ten ml. of concentrated HCl was added and when the vigorous action ceased an additional 10 ml. was added, this was continued until a total of 70 ml. had been added. At the end of the acid addition heat was applied gently until all gas evolution had ceased. The samples were then filtered and washed with hot 1% HCl solution. The nitrogen in the filtrates was then determined.

The total nitrogen content of each of the steels was closely alike and of the order of .007%. It will be noted, however, that while in the untreated steel almost all of the nitrogen (.0062%) was in active and soluble form, in the case of steels 1, 2, 3 and 4 which had been treated with the alloys of my invention the soluble nitrides were greatly reduced to the order of .0015% and the greater part of the nitrogen content of the steels was converted into the inert and insoluble form.

Two bars from the middle of each of the treated ingots were rolled to 1⅞" rd.

High tensile bars were forged to 1 1/16" rd., normalized at 1600° F. (1 hr.), cooled in mica, then machined to .520" rd., hardened at 1550° F. (1 hr.), oil quenched, drawn at 450° F. (2 hr.) and ground. Low tensile bars were forged to 1 1/16" rd. bar, heated to 1600° F. (1 hr.), oil quenched, drawn at 900° F. (2 hr.), then machined and ground. Low and high drawn Izod impact bars were processed in the same manner as the tensile bars. Hardenability bars were forged to 1¼" rd., normalized at 1600° F. (1 hr.), mica cooled, machined and treated per Jominy test at 1550° F. (1 hr.), water cooled. The results of these tests are appended in the table below.

TABLE IV

*Alloy additions*

|  | Plain steel | (1) | (2) | (3) | (4) |
|---|---|---|---|---|---|
| High tensile bar—450° F. draw: | | | | | |
| Yield point | 238,600–236,600 | 247,000–248,850 | 246,200–247,850 | 243,650–243,200 | 247,150–246,600 |
| Ultimate | 250,800–251,450 | 269,600–269,200 | 266,350–266,200 | 270,950–271,100 | 270,200–271,100 |
| Elong. % 2" | 9.5–10.0 | 13.5–13.5 | 12.0–13.0 | 13.0–13.0 | 13.0–13.5 |
| Red. area % | 33.15–34.80 | 51.20–50.95 | 52.60–52.05 | 49.00–50.40 | 50.40–51.50 |
| "P" value | 89.94–92.05 | 115.36–114.98 | 116.39–115.70 | 112.99–114.70 | 114.52–116.02 |
| Izod impact | 5.5 | 21.8 | 19.7 | 17.0 | 22.3 |
| Low tensile bar—900° F. draw: | | | | | |
| Yield point | 126,700–120,400 | 161,400–161,500 | 162,500–161,500 | 157,350–157,900 | 153,700–151,650 |
| Ultimate | 145,700–140,100 | 169,000–169,700 | 164,300–164,900 | 165,950–166,050 | 162,000–161,150 |
| Elong. % 2" | 17.0–16.0 | 16.0–16.0 | 16.0–16.5 | 16.0–17.0 | 18.0–18.5 |
| Red. area % | 56.10–58.65 | 54.75–54.50 | 56.60–55.30 | 56.35–57.15 | 57.40–57.65 |
| "P" value | 96.46–98.40 | 99.50–99.34 | 100.78–99.34 | 100.81–101.79 | 101.28–101.41 |
| Izod impact | 72.7 | 48.6 | 58.7 | 50.1 | 55.9 |
| Hardenability (Jominy test): | | | | | |
| 1/16 | 57 | 58 | 58 | 59 | 58 |
| ⅛ | 57 | 58 | 57 | 58 | 57 |
| ¼ | 54 | 57 | 56 | 57 | 57 |
| ⅜ | 49 | 56 | 56 | 56 | 56 |
| ½ | 41 | 56 | 56 | 56 | 55 |
| ⅝ | 36 | 56 | 55 | 56 | 55 |
| ¾ | 33 | 55 | 55 | 55 | 54 |
| ⅞ | 31 | 55 | 54 | 55 | 52 |
| 1 | 30 | 55 | 53 | 55 | 51 |
| 1½ | 26 | 53 | 48 | 52 | 40 |
| 2 | 24 | 46 | 38 | 44 | 32 |
| 3 | 22 | 36 | 32 | 33 | 28 |

It will be noted from Table III that the heat of oxide formation of the alloys is in all cases over 7.0 and that the heat of nitride formation is in all cases over 4.25. Table IV shows that the steels produced by use of the various reaction alloys were all improved to a similar degree in all of the properties measured. This indicates that so far as the chemical adequacy of the various alloys is concerned, the heat of oxide formation and heat of nitride formation and the oxygen and nitrogen equivalents are important criteria in determining beforehand the suitability of a reaction alloy in improving the physical properties of steel treated with the alloy. Furthermore, that alloys of my invention having heat values of the same order will produce in steel physical properties of the same order, even though the alloys may vary widely in chemical composition.

It will be seen from Table IV that steels which have been treated with small amounts of the reaction alloys have properties which are greatly superior to the untreated steel. Considering the high tensile bars from the treated ingots, which bars were hardened at 1550° F., quenched in oil and drawn at 450° F., it will be seen that they have yield points of approximately 245,000 pounds per square inch, as compared to 238,600 pounds per square inch for the untreated steel. The ultimate tensile strength for the treated steels is of the order of 267,000 pounds per square inch, as compared with 250,000 pounds per square inch for the untreated steel. The elongation for the treated steels is of the order of 13% as compared with 10% for the untreated steel. The reduction in area for the treated steels is of the order of 50%, as compared to 33% for the untreated steel. The "P" value, which is a merit number, is of the order of 114 for the treated steel, as compared to 90 for the untreated steel. The Izod impact value for the treated steel is of the order of 19 foot-pounds, as compared to 5.5 foot-pounds for the untreated steel.

The hardenability as shown by the Jominy test of the treated steels is greatly superior to that of the untreated steel. The range of hardenability for the untreated steel is from 57 Rockwell C hardness at 1/16" to 22 Rockwell C hardness at 3", whereas the hardenability of the treated steels ranges from about 58 Rockwell C hardness at 1/16" down to about 28 Rockwell C at 3". What is more important, however, is the fact that all of the treated steels have a Rockwell C hardness of at least 50 at 1", whereas the untreated steel hardened to 50 Rockwell C for only a distance of ¼". It will be evident, therefore, that since the position in inches from the quenched end of the Jominy bar at which the hardness is 50 Rockwell C is much greater in the case of the treated steels than for the untreated steel, and since these positions are a measure of cooling rates, it follows that a treated steel may be used in much heavier sections than an untreated steel and still be capable of being hardened to the same extent.

In addition to the physical characteristics above noted, treated steels made according to my invention show other remarkable properties, among which is their high impact values, at their high hardness values, at low temperatures.

For example, two samples of steel each having a composition similar to the untreated steel given in Table IV—i. e., carbon about .40% and manganese about 1.70%, were prepared. One of the steels was treated by adding alloy in the amount of four pounds per ton, whereas the other steel was untreated. These two steels were normalized at 1625° F., quenched in oil from 1525° F., and subsequently drawn at 450° F. and cooled in air and tested for impact values by the Charpy method and for hardness by the Vickers Diamond Brinell method and the Rockwell method. The results are shown in the following tables:

*Untreated steel*

| Testing Temp., ° F. | Charpy, ft.-lbs. | | Vickers Diamond Brinell | Rockwell |
| --- | --- | --- | --- | --- |
| | Test 1 | Test 2 | | |
| 70 | 4.0 | 4.0 | 546 | C52 |
| −25 | 4.0 | 4.0 | 542 | C51½ |
| −90 | 4.0 | 4.0 | 544 | C51½ |

*Treated steel*

| Testing Temp., ° F. | Charpy, ft.-lbs. | | Vickers Diamond Brinell | Rockwell |
| --- | --- | --- | --- | --- |
| | Test 1 | Test 2 | | |
| 70 | 21.0 | 22.0 | 514 | C50½ |
| −25 | 22.5 | 21.5 | 514 | C50½ |
| −90 | 17.0 | 18.0 | 514 | C50½ |

It will be appreciated that a steel of this chemical composition and hardness which has an impact value of 17 foot-pounds at −90° F. is very remarkable.

I have found further that steels which have been treated by the addition of small amounts of reaction alloy are much superior to untreated steels, when subjected to case hardening operations involving nitrogen penetration, as, for example, nitriding by $NH_3$ gas, carburizing gas activated by $NH_3$, liquid cyanide baths or liquid cyanide baths activated with ammonia or other nitrogen containing elements. Gears, for automobile transmissions, the gears being made from steel containing about:

| | Percent |
| --- | --- |
| Carbon | .40 |
| Manganese | 1.70 |
| Silicon | .20 |
| Sulphur | .03 |
| Phosphorus | .03 | were heated in a liquid cyanide bath at a temperature of about 1550 to 1575° F. for about 40 minutes, and then quenched in oil and drawn at 450° F. and subjected to destructive tests. Gears of similar composition, except that the steel had been treated with reaction alloy in the amount of four pounds per ton, were also treated and tested under similar conditions. The life of the gears made from the reaction alloy treated steels as determined by excessive pitting and breakage was from 30 to 40 hours, as compared to a similar life or 5 to 15 hours for the gears made from the untreated steel. Microscopic examination of nitrided steels made from steels which have been treated with reaction alloy show a deeper penetration of the hardening gases, that is a deeper nitrided case than those produced from untreated steels.

I have further found that the magnetic properties of steels, for example permeability and coercive force, are changed to a marked degree by the addition of reaction alloy to the steels.

As I have pointed out previously, there are other factors which must be taken into consideration in addition to the chemical adequacy of the alloy as indicated by its heat values.

1. The alloy should contain a minimum of those elements which are harmful to the intended reaction, or should contain some element or elements which compensate at least in part for the detrimental effects of such harmful elements, if present. Since the ability of the alloy to deactivate oxygen and nitrogen is primarily a question of available energy, any element which combines with the nitrogen- or oxygen-fixing elements to form intermetallic compounds and thereby reduces the available energy of the alloy for deoxidation or denitrogenation is undesirable. Also any element which will form soluble (active) nitrides in the iron or steel should be kept below harmful limits. In both of these respects, silicon is a serious offender and my alloys are essentially low silicon alloys or contain some corrective element.

2. The alloy should have a physical form suited to normal steel making processes—i. e., its melting point, solubility, specific gravity, density, etc. should be such that it may be added to the ladle or molten stream and be rapidly absorbed by the steel with little loss. For example, alloys which are of too low specific gravity will float on the surface of the metal and become entrapped in the slag and often react with the air or the slag to a considerable extent and thereby the efficiency of the operation is greatly reduced. Specifically, magnesium powder is chemically adequate for the deoxidation of steel but it is quite impractical to use this material for such purpose.

3. The residual elements of the alloys remaining in the steel after the reaction should be beneficial or at least not harmful to the important physical properties of the steel.

4. The form and distribution of the reaction products should not have any adverse influence on the properties of the steel. For example, in the case where a steel is deoxidized with aluminum metal, as we progressively add aluminum the size of the aluminum particles which are formed as a by-product of the reaction progressively decreases and at certain concentrations appears as a fine suspension closely approaching the colloidal. Under these circumstances, and due to the nature and distribution of the alumina, many disagreeable qualities affecting grain size, banding, carbon diffusion rate, etc. appear. In the case of a steel treated with titanium alone, under certain circumstances the bath is extremely sluggish and I attribute this to the presence of the by-products of the reaction in an unfavorable condition. In compounding my alloy, I therefore choose the combinations of elements to as great extent as possible which will form by-products which melt at a lower temperature than prevails in the steel, thereby insuring some coagulation and a size of by-product which is not detrimental to the reaction.

5. The alloy should be low in cost—that is, readily made from low cost ores.

A preferred alloy according to my invention contains:

| | Percent |
|---|---|
| Titanium | About 20 |
| Aluminum | About 20 |
| Zirconium | About 7 |

Balance substantially all iron.

The active silicon is less than 15% and preferably less than 10% or, better still, less than 5%. The primary purpose of the alloy is to deactivate nitrogen in steel, although it is also important that it have the ability to deoxidize the steel. In this preferred alloy, titanium is used as the principal nitride forming element. It will be noted from Table II that titanium has a very high heat of nitride formation (5.73). Furthermore, titanium nitride is relatively insoluble in steel.

Under actual steel making conditions, it is almost invariably the case that the steel also contains oxygen. If the steel were free from oxygen or were not subject to reoxidation or renitrification from the air after treatment, I might use titanium alone for the purpose of removing the nitrogen. Although a low carbon ferro-titanium might be effective in removing nitrogen from steel, it is not very effective under actual steel making operations, because the titanium reacts with the oxygen before it has a chance to react with the nitrogen, and, therefore, its effect in reducing the active nitrogen content of the steel is lowered. Therefore, the alloy should contain a deoxidizer which is more powerful than the titanium. As deoxidizers, I may use one or more of the elements aluminum, magnesium, strontium, barium or calcium, the preferred deoxidizers being aluminum or magnesium. It will be noted from Table I that aluminum and magnesium each has a higher heat of oxide formation than does titanium and, therefore, they are effective in removing oxygen, thereby saving the titanium for its function of removing nitrogen.

Although an alloy containing titanium and aluminum is suitable for some purposes, it is improved by the addition of zirconium. It is preferred, therefore, that a portion of the titanium of the ferro-titanium aluminum alloy be substituted by zirconium, inasmuch as I am thereby able to raise the heat of oxide formation and maintain a high heat of nitride formation. In other words, the ability of the alloy to remove oxygen is increased, because of the substitution of a part of the titanium by zirconium. The presence of zirconium also improves the form, size and distribution of the reaction products. The preferred alloy, therefore, contains titanium, aluminum and zirconium in proportions such that the titanium is higher than the zirconium.

In some cases, however, the alloy may contain zirconium in greater amount than titanium—that is, the alloy may contain zirconium, aluminum and titanium in which the zirconium is greater than the titanium. Considering two alloys each containing titanium, zirconium and aluminum, the first containing more titanium than zirconium and the second containing more zirconium than titanium, the total of titanium and zirconium being equal in both cases, the first alloy will have a higher oxygen equivalent and a higher nitrogen equivalent than the second alloy. That is, the capacity of the first alloy to combine with oxygen and nitrogen is greater than that of the second alloy. On the other hand, the heat of oxide formation and the heat of nitride formation of the second alloy is greater than that of the first. In other words, the intensity with which the alloy combines with nitrogen is greater for the second alloy than for the first. The alloy may, therefore, contain more titanium than zirconium or more zirconium than titanium, depending upon the particular conditions under which it is desired to use it. However, for most purposes, I prefer the alloy to have higher titanium than zirconium because in an alloy having a sufficiently high intensity factor (heat of nitride formation and heat of oxide formation), it is usually advisable to have a high capacity for removing nitrogen and oxygen.

The incorporation in the alloy containing titanium or zirconium or both titanium and zirconium and also aluminum or another strong deoxidizing element, of a strong carbide forming element, further increases the effectiveness of the alloy under some conditions. Thus alloys containing titanium and aluminum or zirconium and aluminum may advantageously include one or more carbide forming elements such as tantalum, uranium, molybdenum, tungsten or chromium. The preferred carbide forming element is tantalum. The incorporation of carbide forming elements decreases the tendency of the titanium or zirconium to form carbides and thereby leaves them available for reacting with the nitrogen. The carbide forming elements, therefore, act as protecting agents for the nitrogen fixing elements titanium and zirconium, and, in general, improve the density, specific gravity and melting point and other desirable characteristics of the alloy. Tantalum is a particularly useful carbide forming element because it has high heats of oxygen and nitrogen formation and high oxygen and nitrogen equivalents. It may, therefore, be used in relatively large or small amount without unduly altering the heat values of the alloy.

In my alloy, the active ingredients are always used in such proportion as to produce an alloy having an average heat of oxide formation per gram of oxygen of at least 7 kg. cal., preferably at least 7.10, and a heat of nitride formation per gram of nitrogen of at least 4.25, preferably at least 4.50, when these values are obtained by the Formulae 5 and 6, using the values given in Tables I and II for the constants involved and considering only the active elements in their active form.

The amount of oxygen and nitrogen which can be combined with a given amount of alloy is a function of its oxygen and nitrogen equivalent of the alloy. My alloy has an oxygen equivalent of at least 10 grams of oxygen per 100 grams of alloy and preferably has an oxygen equivalent of at least 30 grams of oxygen per 100 grams of alloy. The alloy has a nitrogen equivalent of at least 5 grams of nitrogen per 100 grams of alloy and preferably has a nitrogen equivalent of at least 15 grams of nitrogen per 100 grams of alloy. An alloy having an oxygen equivalent of about 30 and a nitrogen equivalent of about 15 is generally used in an amount of about four pounds per ton in treating open hearth steels.

The alloy preferably contains:

| | Percent |
|---|---|
| Titanium | About 10–30 |
| Aluminum | About 10–30 |
| Zirconium | About 2–12 |
| Balance substantially all iron. | |

The ratio of the titanium, aluminum and zirconium to each other is an important consideration. When an alloy has a given ratio of active elements, the actual percentages of the different active elements may be increased or decreased but if kept in the same ratio, the only change in effectiveness of the alloy from a purely chemical standpoint is one of dilution of concentration. Thus an alloy containing 40% titanium, 40% aluminum and 14% zirconium as active elements would have substantially the same effect in deoxidizing and denitrogenizing a steel bath, except that it could be used in amount of only ½ that which would be required if an alloy were used containing 20% titanium, 20% aluminum, and 7% zirconium. Similarly an alloy containing 10% titanium, 10% aluminum and 3.5% zirconium would produce substantially the same effects but would have to be used in twice the amount of an alloy containing 20% titanium, 20% aluminum and 7% zirconium. I do not mean by this, however, that this type of dilution is of no importance, because it is often desirable to have the actual contents of the active elements in an alloy within certain given ranges, in order to produce an alloy having suitable specific gravity, melting point and other physical properties and the efficiency of the alloy is, to a considerable extent, a function of the state of dilution of the active elements in the alloy.

Although the titanium, aluminum and zirconium are preferably within the ranges above given, the ranges of these elements may be somewhat broader. The alloy may contain titanium from about 2 to 65%, aluminum from about 2 to 50% and zirconium from about 2 to 65%.

From the standpoint of the effect of the reaction alloy on deoxidizing and denitrogenizing steel, the presence of silicon is definitely detrimental. Its low heat of oxide formation and low heat of nitride formation lower the average heat of oxide and nitride formation of the alloy and thereby render it less effective. Secondly, silicon forms inter-metallic compounds with some of the principal active elements of the bath, such as calcium, barium or strontium and thereby reduces the available energy of those elements for deoxidation and denitrogenation. Thirdly, silicon forms a nitride which is soluble in steel.

Referring to the harmful effect of silicon in forming soluble nitrides in steel, it is the amount of silicon which is in active form in the alloy which is of importance. The reaction alloy may contain considerable amounts of silicon, provided that it is in a compound so that the silicon is not in active form. Thus in the example previously referred to of an alloy which analyzes 15% zirconium, 20% titanium, 10% aluminum, 4% calcium, 8% silicon and 4% carbon not all of the silicon is in active form. The 4% of calcium is sufficient to combine with 5.6% of silicon to form calcium silicide, leaving in the alloy only 2.4% of silicon in active form. It is only the silicon which is in active form which is harmful in forming the soluble nitrides and which should, therefore, be kept low in amount. In my alloy, the active silicon is not more than 15%, preferably less than 10%, and better still is less than 5%. It is desired to keep the silicon as low as possible but my alloy may contain small amounts of silicon, because such alloy is easier or more economical to produce than one not containing silicon.

It also is preferred that the carbon in my alloy be as low as possible. The carbon should not be over about 5% and generally is under about 2%. The carbon combines with titanium and zirconium, thereby using up a portion of the titanium or zirconium which would otherwise be available for fixing nitrogen. Due to the difference in atomic weights between carbon and titanium and zirconium, even relatively small amounts of carbon in the alloy will combine with relatively large amounts of titanium and zirconium, thereby considerably reducing the effectiveness of the alloy for deactivating nitrogen.

Although it is preferred that the alloy contain both titanium and zirconium and also aluminum, it may contain only titanium and aluminum or zirconium and aluminum. The alloy may contain titanium or zirconium or both titanium and zirconium in amount between about 2 and 65%, aluminum or magnesium or a combination of aluminum and magnesium in amount of about 2 to 50%. In any of the alloys, the aluminum may be replaced either partially or totally by magnesium.

Although aluminum and magnesium are the preferred deoxidizers, I may replace either or both of them in whole or in part by one or more of the elements barium, calcium or strontium. Due to the fact that the oxides of barium, strontium and calcium combine with other refractory oxides, such as titanium oxides, and form thereby a product of low melting point the use of these elements is also advantageous in some instances for their scavenging effect. Furthermore, these elements are most useful in correcting the detrimental effects of silicon.

To recapitulate, titanium in my alloy may be from about 2% to 65%, preferably between 10 and 30%. The aluminum may be from 2% to 50%, although it usually is at least 5%. Preferably the aluminum is between about 10 and 30%. The zirconium is from about 2% to 65%, preferably from about 2% to 12%. Where the alloy contains both titanium and zirconium, the sum of the titanium and zirconium does not exceed 80%. Carbon and silicon are subversive elements and are kept low. The carbon is not over about 5% and preferably is not over about 2% or better still it is not over about 1%. The total silicon in the alloy is not over about 30%. The active silicon is in no case over about 15% and is preferably not over 10%. It is still more preferable that the active silicon be not over about 5%.

The titanium or zirconium or the sum of the titanium and zirconium where both are present in the alloy should be in amount which is sufficient to react with the carbon in the alloy and still leave at least about 10% of titanium or zirconium in the uncombined state. The calcium, barium or strontium, or where more than one is present in the alloy the sum of them, should amount to about 5 to 30%. They should be present in quantities sufficient so that they will react with the silicon in the alloy and leave not over about 15% of silicon in active form. Preferably the active silicon should be less than 10% or, better still, less than 5%.

The modifying elements tantalum, uranium, molybdenum, tungsten and manganese should be present in the alloy in the total amount ranging from an effective amount up to about 40%. An effective amount usually is in the neighborhood of 2% or more.

The balance of the alloy, aside from the active elements which have been referred to, is usually iron. However, my invention is not restricted to ferrous alloys. I may replace iron, either in whole or in part, by one or more of the elements, nickel, manganese, cobalt or copper or other element or elements which are not subversive of the properties of the alloy. The use of these elements may in some cases facilitate the making of the alloy or it may render the alloy more desirable from the standpoint of specific gravity, solubility, melting point and other physical properties, as has been heretofore described.

The invention will be further understood by reference to the ternary diagrams of Figs. 1, 2, 3 and 4.

Considering first Fig. 1, this is a ternary diagram illustrating the system titanium, zirconium and aluminum. It will be noted from Tables I and II that the heats of oxide formation and nitride formation of titanium, zirconium and aluminum are:

|  | Oxide formation | Nitride formation |
| --- | --- | --- |
| Titanium | 6.85 | 5.73 |
| Zirconium | 8.07 | 5.86 |
| Aluminum | 7.95 | 4.00 |

These values are also indicated on the drawings. On this diagram, the area 1—2—3—4—5 includes all combinations of titanium, zirconium and aluminum having a heat of oxide formation of at least 7.10 and a heat of nitride formation of at least 4.50. It should be understood that the percentages of titanium, zirconium and aluminum as given on this diagram are not the percentages of these elements in the alloy which is to be added to iron or steel. They are, however, the percentages of these elements when these elements are considered as constituting 100%. It will be noted that any combination of these elements lying to the left of the line 2—3 has a heat of oxide formation ($H_1{}^O$) of at least 7.10. It will be noted further that any combination lying to the right of the line 1—5 has a heat of nitride formation ($H_1{}^N$) of at least 4.50. Accordingly the area 1—2—3—4—5 represents combinations in which the heat of oxide formation is at least 7.10 and the heat of nitride formation is at least 4.50.

Any combination within the area 1—2—3—4—5, therefore, has satisfactory heat of oxide formation and heat of nitride formation according to the invention but there are other criteria, as have been referred to herein, which should also be taken into consideration. I, therefore, prefer that the percentages of the zirconium, aluminum and titanium should be such as to fall within the more restricted area 6—7—8—9—10. I prefer that the composition fall within the even more restricted area 11—12—13—14—15—15a. Compositions falling within this smallest area 11—12—13—14—15—15a are advantageous for a number of reasons. They have a very high nitrogen equivalent. They are easy to make and have good physical form, good solubility in iron and steel and are of sufficiently low melting point. The products of reaction of these alloys with oxygen and nitrogen of the steel are of composition, size and melting point such as to produce steel of very satisfactory qualities.

It is quite advantageous that the alloy contain all three of the elements titanium, zirconium and aluminum. If the composition were constituted entirely of titanium and aluminum, as shown by the diagram, the aluminum would have to lie between 20 and 58% and the titanium between 42 and 80%, in order to give a heat of oxide formation of at least 7.10 and a heat of nitride formation of at least 4.50. If, however, the composition contains zirconium in addition to the titanium and aluminum, the ranges of titanium and aluminum which can be used and still produce the same heat values are considerably broadened. For example, if the composition contains, say, 20% of zirconium, the aluminum may be from about 7 to 53% and the titanium from about 27 to 73%. In other words, by the inclusion of zirconium in the composition I have a wider latitude in varying the proportions of titanium and aluminum, in order to produce compositions which give me the other properties which are desirable in the compositions. A further advantage of using zirconium as well as titanium as nitrogen fixing elements is that the products of reaction are in more favorable form than would be the products of reaction of either titanium or zirconium used singly.

Figure 2:
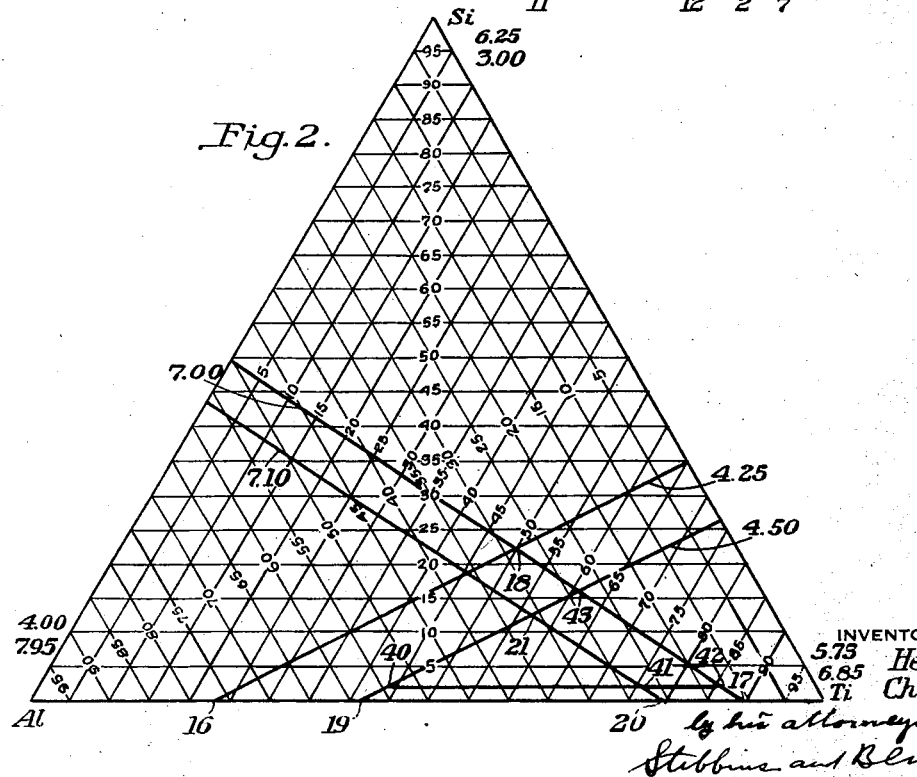

The inclusion of silicon in a titanium alloy is definitely detrimental, as will be seen by reference to Fig. 2. This figure is a ternary diagram of the system titanium-aluminum-silicon. Compositions within the area 16—17—18 each have a heat of oxide formation of at least 7.0 and a heat of nitride formation of at least 4.25. Compositions within the smaller area 19—20—21 have a heat of oxide formation of at least 7.10 and a heat of nitride formation of at least 4.50. If the composition contained only titanium and aluminum, the aluminum might be between 20 and 58% and the titanium between 42 and 80% and the compositions would each have a heat of oxide formation of at least 7.10 and a heat of nitride formation of at least 4.50. It will be noted, however, that as silicon is included in the composition the range of aluminum and titanium rapidly decreases and that when there is above 13% of silicon, no combination of aluminum, titanium and silicon will produce a heat of oxide formation of at least 7.10 and a heat of nitride formation of at least 4.50.

The composition represented by the numeral 21 contains about 30% aluminum, 57% titanium and 13% silicon. In this composition, the ratio of titanium to aluminum is approximately 2:1. Alloys containing this ratio of titanium and aluminum will, therefore, permit a higher silicon content than any other ratio of these elements, while still maintaining adequate heat of oxide formation and heat of nitride formation. This is also an advantageous ratio of these elements from the point of view of the melting point of the reaction products.

I prefer that the percentages of these elements titanium, aluminum and silicon in their active form when calculated on the basis that said active elements in active form constitute 100%, fall within the area 40—42—43. Any composition falling within this area has a heat of oxide formation of at least 7.0 and a heat of nitride formation of at least 4.50. I further prefer that the composition be such that it fall within the more restricted area 40—41—21. Compositions within this more restricted area have a heat of oxide formation of at least 7.10 and a heat of nitride formation of at least 4.50. These areas include compositions having the advantageous ratio of titanium to aluminum of approximately 2:1. In general, alloys which have a higher heat of oxide formation, all other characteristics being the same, are superior to those having lower heats of oxide formation.

Figure 3:
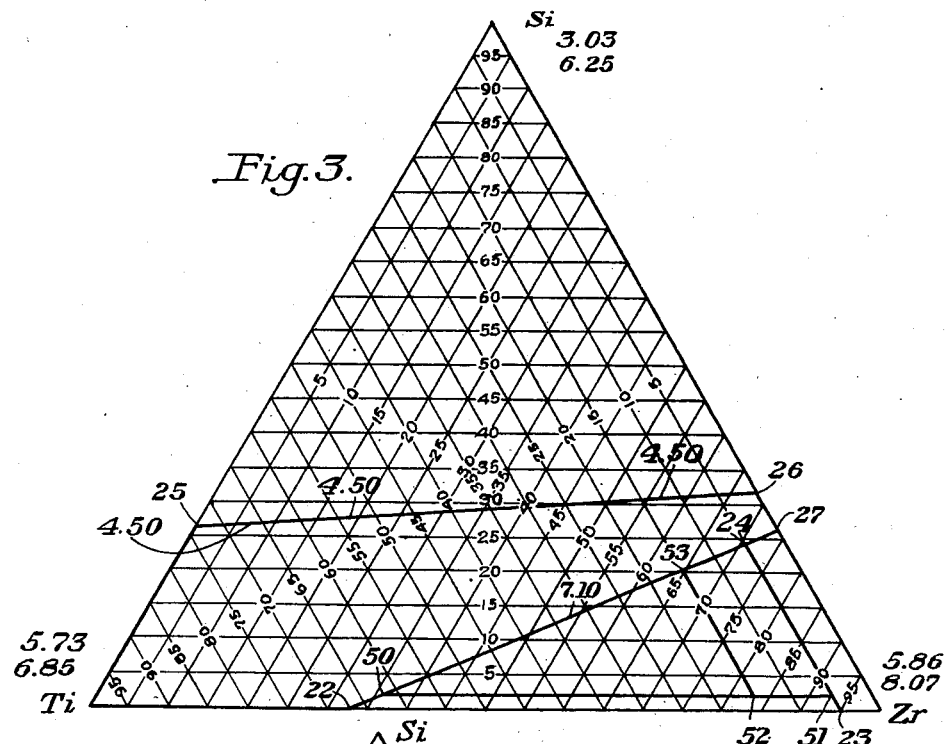

Fig. 3 represents the system titanium-zirconium-silicon. All compositions falling within the area 22—23—24 have a heat of oxide formation of at least 7.10 and a heat of nitride formation of at least 4.50. In this figure, any composition below the line 25—26 has a heat of nitride formation of at least 4.50. Any composition below the line 22—24 or its extension 27 has a heat of oxide formation of at least 7.10. Accordingly the area 22—23—24 represents compositions having both a heat of oxide formation of at least 7.10 and a heat of nitride formation of at least 4.50. It will be noted from this diagram also that the inclusion of silicon in the composition rapidly decreases the ranges of titanium and zirconium which can be used and still give satisfactory heat values. When the silicon exceeds about 25%, no combination of titanium and zirconium will give the heat values of 7.10 and 4.50.

It is preferred that the percentages of titanium, zirconium and silicon in their active form when calculated on the basis that said active elements in active form constitute 100%, fall within the area 50—51—24 in the ternary diagram of Fig. 3. Alloys containing titanium, zirconium and silicon are advantageous as compared to similar alloys not containing titanium in that their reaction products are such that the properties of the steel to which the alloy is added are improved and the physical and chemical properties of the alloy such as specific gravity, solubility in steel, and melting point are improved. It is preferred that the percentages of the elements as above referred to fall within the more restricted area 50—52—53.

Figure 4:
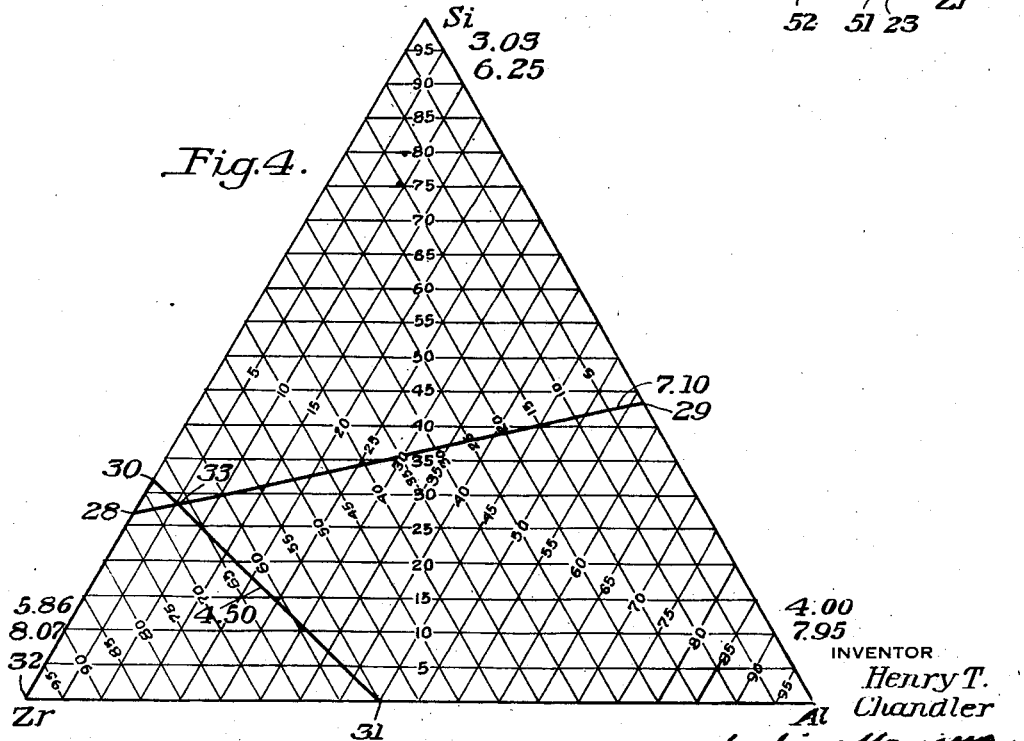

The ternary diagram for the system zirconium-aluminum-silicon is shown in Fig. 4. All compositions below the line 28—29 have a heat of oxide formation of at least 7.10. All compositions to the left of the line 30—31 have a heat of nitride formation of at least 4.50. Accordingly, all compositions within the area 32—31—33—28 have a heat of oxide formation of at least 7.10 and a heat of nitride formation of at least 4.50.

In determining whether an alloy which is to be added to iron or steel falls within any of the areas shown on any of the Figures 1 through 4, it should be borne in mind that these ternary diagrams have been constructed on the basis of the active elements in their active form constituting 100%. Therefore, in figuring whether or not a given alloy comes within the defined areas the following method is to be used:

1. Only the active elements in the alloy, as previously described, are to be considered.
2. The subversive elements as previously referred to, such, for example, as silicon and carbon, are to be considered and one must calculate the amount of active elements which combine with the subversive elements and from this it is determined how much of each active element in active form exists in the alloy.
3. The active elements in active form are to be considered as constituting 100%.
4. If the percentages of active elements in their active form fall within the areas referred to, they are adequate so far as the heat of oxide formation and the heat of nitride formation are concerned.

The ternary systems shown in Figs. 1, 2 and 4 include aluminum as one of the elements. The elements magnesium, calcium, barium and strontium influence the composition in a manner quite similar to aluminum, since their heats of oxide formation and heats of nitride formation are generally of the same order. Accordingly the areas defining the compositions as referred to when the composition contains aluminum are also generally true when the composition contains one or more of the elements magnesium, calcium, barium or strontium. The exact values when the composition contains any of these elements magnesium, calcium, barium or strontium can be readily calculated.

In Fig. 1, I have shown the ternary diagram titanium-zirconium-aluminum and in Figs. 2, 3 and 4 I have shown ternary diagrams of silicon with each of the possible combinations of any two of titanium, zirconium and aluminum. From these four ternary diagrams, a solid can be readily constructed which will represent the quaternary system titanium, zirconium, aluminum and silicon and all compositions coming within that solid will have a heat of oxide formation of at least 7.10 and a heat of nitride formation of at least 4.50.

As has been pointed out previously, iron or steel baths always contain more or less nitrogen and oxygen and it is an object of the present invention to fix or remove these constituents. As an example, steel of the type known as SAE 4615, which is a low carbon nickel molybdenum steel, may contain from .001 to .100% oxygen, when prepared in an open hearth furnace and from .008 to .03% oxygen when prepared in an electric furnace. It may contain, for example, from .002% to .019% nitrogen when produced in an open hearth furnace and from .006 to .015% nitrogen when produced in an electric furnace. These quantities of oxygen and nitrogen will vary according to the type of steel and the processes employed in their manufacture.

The process of deactivating nitrogen and oxygen according to the present invention involves three principal steps, which are referred to more in detail hereinafter.

1. Preparation of a suitable steel bath.
2. Addition to the bath of a nitrogen deactivator or a nitrogen deactivator and a deoxidizer.
3. Prevention or suppression of renitrification of the steel.

1. In the preparation of a suitable steel bath, the usual or any desired steps of melting, refining and adjusting of composition may be employed. The refining may involve the use of slags and ores for reducing the sulphur and phosphorus to the desired amount and otherwise adjusting the composition of the steel. It may include the addition of ferro-alloys. The effect of the melting and refining operations is to produce a steel bath having approximately the content of carbon, silicon, manganese, sulphur and phosphorus which is desired in the final steel. The steel does, however, contain nitrogen and oxygen, which it is desired to deactivate by the use of reaction alloys.

After a suitable steel bath has been prepared by melting and refining, it is generally advisable to add a deoxidizer such as aluminum but, if desired, the deoxidizer may be omitted, provided that the alloy subsequently added for fixing the nitrogen also contains a deoxidizer.

2. The next step is the addition to the steel bath of a nitrogen deactivator which may, for example, be titanium or zirconium or an alloy or intimate mixture of both titanium and zirconium. In place of the alloy or mixture, I may use titanium and zirconium added either simultaneously or subsequently. It is preferred, however, that the titanium and zirconium or other nitrogen deactivator be used in the form of an alloy rather than as separate or simultaneous additions of mere mechanical mixtures of the deactivators. In selecting an alloy or mixture of active elements, it is preferred that they contain both a nitrogen deactivator such as titanium or zirconium, which has a strong affinity for nitrogen, and a deoxidizer, such as aluminum or magnesium or other strong deoxidizer which has a stronger affinity for oxygen than does the nitrogen deactivator. By the use of a combination of titanium and aluminum, for example, the aluminum acts as a deoxidizer in preference to the titanium, thereby preserving the titanium for reaction with nitrogen. My process is not limited to the use of any particular alloy but is applicable in general to any material which has a strong affinity for nitrogen—that is, will form stable insoluble nitrides with the nitrogen in the steel under the conditions that prevail in a steel bath. Although a nitrogen deactivator itself, for example titanium or zirconium, would be suitable by themselves to form insoluble nitrides if the steel did not have access to oxygen, under the conditions which prevail generally in steel making, the steel has access to both oxygen and nitrogen and it is, therefore, advisable that the reaction alloy contain a strong deoxidizer in addition to a strong nitrogen deactivator. It is also desirable that the reaction alloy or mixture have an average heat of oxide formation according to Equation V of at least 7 and an average heat of nitride formation according to Equation VI of at least 4.25. The alloy should, of course, in addition, have the other properties, such as suitable specific gravity, solubility, etc. previously referred to. I have found that in using an alloy containing about 20% titanium, 20% aluminum and 7% zirconium as active elements and having a heat of oxide formation over 7 and a heat of nitride formation of over 4.25 an amount of alloy of about 2 to 6 pounds per ton is sufficient to effectively deactivate nitrogen and oxygen in treating basic open hearth steel.

The amount of alloy needed for any given condition is, of course, a function of both the heat of oxide formation and nitrogen formation and the oxygen and nitrogen equivalent of the alloy.

3. After the alloy has been added to the steel bath, it is necessary to provide some means for preventing or inhibiting renitrification of the steel. One way of accomplishing this is to add the alloy in amount sufficient so that the steel when solidified contains a residual of active elements from the alloy. That is, the alloy is added in an amount which is in excess of that required to deoxidize and denitrogenize the steel and sufficient to prevent renitrification and reoxidation. It will be seen that if the alloy is added at an early stage of the process more alloy may be required than if added at a later stage, in order to insure that in both cases there will be some residual of active elements in the steel when it solidifies.

From the point of view of preventing loss of the alloy itself and insuring a residual of the active elements in the steel, it is preferred to add the alloy to the steel in the ingot mold. The mold itself acts as a protection against renitrification and reoxidation and in addition the time during which these phenomena could occur is at a minimum. For practical reasons, however, it may be desired to add the alloy either in the ladle or in some cases in the furnace or in other cases during pouring from the furnace to the ladle or from the ladle to the ingot mold. Generally no special precautions need be taken when the alloy is added to the steel in the ladle, unless it is to be held there an undue length of time, because ordinarily there is sufficient slag formed on the top of the ladle to protect the steel against reoxidation and renitrification. However, it has been observed that a slightly larger amount of alloy is required where the alloy is added to the ladle over that required where it is added to the ingot mold. Where the alloy is added to the steel in the furnace, even larger amounts of the reaction alloy are required as the opportunity for reoxidation and renitrification is increased. Reoxidation and renitrification can be suppressed or prevented by some mechanical means, such as the use of a protective slag, a protective covering of coke or by carrying out the operation in a closed container.

The amount of reaction alloy added to the steel will vary according to the nitrogen and oxygen content of the steel and according to the degree of denitrification and deoxidation which is desired and upon the time and the conditions under which the reaction alloy is added. There are two general ways in which the amount of reaction alloy to be added may be determined. I may add an amount of the alloy which from past experience I know is sufficient to provide an excess of the active elements in the steel when it has solidified. Thus I may add say four pounds of the alloy per ton to each heat of basic open hearth steel that is made. If it is found that in some instances this produces a residual of active elements in the steel and in other cases it does not, then, of course, the amount of reaction alloy should be increased. In this manner, I arrive at an amount of alloy per ton which should be added to each heat and which will insure that there will always be an excess of active ingredients in the steel when it has solidified under the conditions of manufacture which prevail for that steel. This method is simple in that no tests are thereafter required for each individual heat to determine what amount of reaction alloy shall be used but it is objectionable in that the amount of alloy added is more in some cases than is actually required to produce the desired results—that is, desired degree of denitrification and deoxidation. It will be understood that the contents of nitrogen and oxygen vary from heat to heat and, therefore, in order to insure that there will always be an excess of the active elements in the steel when solidified, it is necessary in practice to use an amount which under some circumstances would be more than sufficient to produce the desired result.

The other and more efficient method of determining the amount of reaction alloy is to test the steel to determine some properties which are affected by the nitrogen content of the steel and are altered by the alloy addition. I have found that these properties which I measure are dependent upon the active nitrogen content of the steel and, therefore, the test which I make is an indication of the relative active nitrogen content of the steel as compared with a known standard. In this way, a rapid determination of the amount of alloy which should be added may be made and then the alloy is added in accordance with the determination, in order to produce whatever degree of denitrification may be desired. Thus I use only approximately the amount of reaction alloy which is required to produce the desired effects in each individual heat.

The preferred method of testing for the nitrogen content of a steel bath is as follows. A sample of the steel is taken from the bath after the bath has reached the point where it is ready for alloy addition and the sample is cast into a block having a length of 4" and a width and thickness of about 1½". This is to be compared with a standard sample of the same dimensions and of the same chemical composition as far as carbon, manganese, silicon, phosphorus and sulphur and alloying elements are concerned, but which contains a low nitrogen content. The actual size of the standard and sample may be different from that described but each should be of substantially the same dimensions as the other. The sample block and the standard block are placed in a furnace and a pyrometer is connected to each block in such manner that the difference in temperature between the sample and the standard may be recorded. The standard and sample are located in the furnace so as to be under as nearly identical furnace temperature conditions as possible and the entire setup so arranged that any difference in temperature between the standard and sample is due to differences in evolution or absorption of heat from reactions within the two steels themselves during heating or cooling. I may use resistance pyrometers, optical pyrometers, thermocouples or any other type of temperature measuring instruments which can be arranged and are of sufficient sensitivity to measure differences in temperature between the sample and the standard. Referring to Fig. 5, which illustrates in a diagrammatic way one suitable arrangement, the standard block 60 and the sample block 61 are placed in a furnace 62 and are connected to a recording instrument 63, as indicated. The hot junction 64 is placed in the standard and the cold junction 65 is placed in the sample, or vice versa, and connected by the wire 66, and the other wires 67 and 68 are connected to the indicating instrument 63. The indicator thus shows the difference in temperature between the standard and the sample. In order to record at what actual temperatures there are differences in temperatures between the standard and the sample, a second thermocouple 69 is placed in the furnace, and is connected to an indicating device 70.

The temperature of the furnace is raised to some selected temperature above the critical points of the standard and sample (which are the same), say 1600° F., and the standard and sample are allowed to cool. The cooling rate is not critical. It may be either fast or slow. I have found that a cooling rate of even 25° F. per minute through the critical range is satisfactory but this rate is slower than would be convenient for routine testing. The cooling rate preferably is of the same order as that which occurs when the article made from the steel in question is quenched in order to harden it. The differences in temperature between the standard and the sample when they are passing through their critical ranges are noted and these differences in temperatures are used to determine the amount of alloy, if any, which need be added to the steel.

Fig. 6 represents in a diagrammatic manner the curves which may be obtained in carrying out the test as above referred to. The vertical ordinate represents temperatures in degrees F. and the horizontal ordinate represents the difference in temperature between the standard and the sample for any given temperature. When the furnace has been heated to a selected temperature, say 1600° F., the standard and sample are both at the same temperature and they remain at substantially the same temperature as they are cooled down to a certain point. The composition of the standard block and of the sample block, the curves of which are represented in Fig. 6, was that of a T-1340 steel containing.

| | Per cent |
|---|---|
| Carbon | .43 |
| Manganese | 1.77 |
| Silicon | 0.24 |
| Phosphorus | 0.25 |
| Sulphur | 0.28 | with the following exception. The standard had been treated to deactivate nitrogen, so that it contained only between .001 and .002 active nitrogen and about .005 total nitrogen, whereas the sample was the same steel, except that it had not been treated to deactivate nitrogen and contained a total of .007 nitrogen and an active nitrogen of .005. Considering this particular sample and standard, it will be noted that at 1300° F. there is no difference in temperature between them and that there is no difference in temperature down to about 1260° F. At this point, the steels enter their critical range and the curve B bears to the left from the normal curve A and the curve B remains displaced from the normal curve down to a temperature of about 1200° F. The fact that curve B departs from the normal curve A shows that during this critical range there is a difference in temperature between the sample and the standard. This difference in temperature between the standard and the sample is linked up with the rate of transformation of the standard and sample through their critical ranges, such as the transformation from austenite to martensite, from martensite to troostite, from troostite to sorbite and pearlite. This deviation is dependent both upon the differences of rates of the above changes as well as the amount of heat evolved during the reaction. This deviation of the curve B from the normal curve A shows that the active nitrogen in the sample is greater than the active nitrogen in the standard and, therefore, the hardenability of the sample is not as great as the hardenability of the standard. I wish to decrease the nitrogen in the steel bath and I, therefore, add an alloy which may be, say, 20% titanium, 20% aluminum and 7.5% zirconium, with the balance iron. Assume that I add one pound of this alloy per ton and obtain another sample and test the second sample against a standard in the same way as has been described. It will be found that the curve C, which represents the difference in temperature between the standard and the sample, is moved to the right, that is toward the normal curve A. If increasing amounts of the alloy are added to the steel bath and other samples are taken and other tests are made, it will be found that the normal curve A is reached showing that the steels are behaving alike. In fact, by the addition of sufficient alloy it is possible to produce a curve D which lies on the opposite side of the normal from the curve B, provided that the normal curve A represents an amount of nitrogen which is not the lowest amount which can be obtained by adding alloy to the steel.

I have described a preferred method of testing for the effects of nitrogen in a steel or more broadly a method of testing to determine a behavior of a steel which is related to its active nitrogen content. It is to be understood, however, that the invention is not limited to the preferred testing method. Other methods may be employed, even though not as desirable, and after the test has been performed alloy may be added to bring the steel to some desired degree of uniformity. I believe that the desired properties in steel, for example hardenability and other physical properties such as tensile strength, impact values, magnetic properties and dynamic properties, are dependent upon the state and content of nitrogen and oxygen in the steel. I have found that this test gives me valuable information in determining how much, if any, alloy should be added to bring the steel within a given degree of uniformity of physical characteristics.

Reaction alloys according to the present invention may be made by the electric furnace process, the aluminothermic process or by a combination of such processes.

Although I have described certain preferred embodiments and procedures for carrying out the invention, it is to be understood that the invention is not so limited but may be otherwise embodied or practiced within the scope of the following claims.

I claim:

1. The process of making steel, which comprises obtaining a sample of steel from a bath of steel, obtaining a standard the physical properties of which are known and has substantially the same chemical composition as the sample except for active nitrogen, testing the sample and standard by means which indicate the relative contents of active nitrogen in the sample and standard, and adding to the bath of steel nitrogen deactifying material in accordance with the test to produce steel having the desired physical properties.

2. An alloy for addition to iron or steel, containing at least one element of the group consisting of titanium and zirconium, at least one element of the group consisting of aluminum and magnesium, silicon in amount not over 30%, at least one element of the group consisting of the alkaline earth metals and alkali-metals, the elements of said group consisting of the alkaline earth metals and alkali-metals being sufficient to combine with the silicon and leave not over about 10% of silicon in active form, an effective amount up to about 40% of at least one of the elements of the group consisting of tantalum, uranium, molybdenum, tungsten and manganese, the balance being one or more elements which are not subversive of the reaction characteristics of the alloy, the alloy having an average heat of oxide formation per gram of oxygen according to the formula $$H_I^O = \frac{H_{100}^O}{O_{100}} =$$

$$\frac{k_I . h_I^O . (Me_I) + k_{II} . h_{II}^O . (Me_{II}) + k_{III} . h_{III}^O . (Me_{III}) + \ldots}{k_I . (Me_I) + k_{II} . (Me_{II}) + k_{III} . (Me_{III}) + \ldots}$$

of at least 7.0 and a heat of nitride formation per gram of nitrogen according to the formula $$H_I^N = \frac{H_{100}^N}{N_{100}} =$$

$$\frac{l_I . h_I^N . (Me_I) + l_{II} . h_{II}^N . (Me_{II}) + l_{III} . h_{III}^N . (Me_{III}) + \ldots}{l_I . (Me_I) + l_{II} . (Me_{II}) + l_{III} . (Me_{III}) + \ldots}$$

of at least 4.25 said alloy having an oxygen equivalent of at least 10 grams of oxygen per 100 grams of alloy according to the formula $$O_{100} = k_I . (Me_I) + k_{II} . (Me_{II}) + k_{III} . (Me_{III})$$

and a nitrogen equivalent of at least 5 grams of nitrogen per 100 grams of alloy according to the formula $$N_{100} = l_I . (Me_I) + l_{II} . (Me_{II}) + l_{III} . (Me_{III})$$

3. An alloy for addition to iron or steel containing at least one element of the group consisting of titanium and zirconium, at least one element of the group consisting of aluminum and magnesium, silicon in amount not over 30%, carbon not over about 5%, at least one element of the group consisting of the alkaline earth metals and alkali-metals, the elements of said group consisting of the alkaline earth metals and alkali-metals being sufficient to combine with the silicon and leave not over about 10% of silicon in active form, the titanium and zirconium or either of them being present in amount sufficient to react with the carbon and leave at least about 10% of titanium or zirconium or both of them in active form, an effective amount up to 40% of at least one element of the group consisting of tantalum, uranium, molybdenum, tungsten and manganese, the balance being one or more elements which are not subversive of the reaction characteristics of the alloy, the alloy having an average heat of oxide formation per gram of oxygen according to the formula $$H_I^O = \frac{H_{100}^O}{O_{100}} =$$

$$\frac{k_I . h_I^O . (Me_I) + k_{II} . h_{II}^O . (Me_{II}) + k_{III} . h_{III}^O . (Me_{III}) + \ldots}{k_I . (Me_I) + k_{II} . (Me_{II}) + k_{III} . (Me_{III}) + \ldots}$$

of at least 7.0 and a heat of nitride formation per gram of nitrogen according to the formula $$H_I^N = \frac{H_{100}^N}{N_{100}} =$$

$$\frac{l_I . h_I^N . (Me_I) + l_{II} . h_{II}^N . (Me_{II}) + l_{III} . h_{III}^N . (Me_{III}) + \ldots}{l_I . (Me_I) + l_{II} . (Me_{II}) + l_{III} . (Me_{III}) + \ldots}$$

of at least 4.25 said alloy having an oxygen equivalent of at least 10 grams of oxygen per 100 grams of alloy according to the formula $$O_{100} = k_I . (Me_I) + k_{II} . (Me_{II}) + k_{III} . (Me_{III})$$

and a nitrogen equivalent of at least 5 grams of nitrogen per 100 grams of alloy according to the formula $$N_{100} = l_I \cdot (Me_I) + l_{II} \cdot (Me_{II}) + l_{III} \cdot (Me_{III})$$

4. An alloy for addition to iron or steel, containing from 2 to 65% of titanium, from 2 to 65% of zirconium, at least one element of the group consisting of aluminum and magnesium, at least one element of the group consisting of the alkaline earth metals and alkali-metals, in amount from 5 to 30%, not over about 10% silicon in active form, at least one element of the group consisting of tantalum, uranium, molybdenum, tungsten and manganese from an effective amount up to 40%, the balance being one or more elements which are not subversive of the reaction characteristics of the alloy, the alloy having an average heat of oxide formation per gram of oxygen according to the formula $$H_1^O = \frac{H_{100}^O}{O_{100}} =$$

$$\frac{k_I \cdot h_I^O \cdot (Me_I) + k_{II} \cdot h_{II}^O \cdot (Me_{II}) + k_{III} \cdot h_{III}^O \cdot (Me_{III}) + \ldots}{k_I \cdot (Me_I) + k_{II} \cdot (Me_{II}) + k_{III} \cdot (Me_{III}) + \ldots}$$

of at least 7.0 and a heat of nitride formation per gram of nitrogen according to the formula $$H_1^N = \frac{H_{100}^N}{N_{100}} =$$

$$\frac{l_I \cdot h_I^N \cdot (Me_I) + l_{II} \cdot h_{II}^N \cdot (Me_{II}) + l_{III} \cdot h_{III}^N \cdot (Me_{III}) + \ldots}{l_I \cdot (Me_I) + l_{II} \cdot (Me_{II}) + l_{III} \cdot (Me_{III}) + \ldots}$$

of at least 4.25 said alloy having an oxygen equivalent of at least 10 grams of oxygen per 100 grams of alloy according to the formula $$O_{100} = k_I \cdot (Me_I) + k_{II} \cdot (Me_{II}) + k_{III} \cdot (Me_{III})$$

and a nitrogen equivalent of at least 5 grams of nitrogen per 100 grams of alloy according to the formula $$N_{100} = l_I \cdot (Me_I) + l_{II} \cdot (Me_{II}) + l_{III} \cdot (Me_{III})$$

5. An alloy for addition to iron or steel, containing from 2 to 65% of titanium, from 2 to 65% of zirconium, not over 30% silicon, at least one element of the group consisting of the alkaline earth metals and alkali-metals, in amount sufficient to react with the silicon and leave not over about 10% silicon in active form, an effective amount up to 40% of at least one element of the group consisting of tantalum, uranium, molybdenum, tungsten and manganese, the balance being one or more elements which are not subversive of the reaction characteristics of the alloy, the alloy having an average heat of oxide formation per gram of oxygen according to the formula $$H_1^O = \frac{H_{100}^O}{O_{100}} =$$

$$\frac{k_I \cdot h_I^O \cdot (Me_I) + k_{II} \cdot h_{II}^O \cdot (Me_{II}) + k_{III} \cdot h_{III}^O \cdot (Me_{III}) + \ldots}{k_I \cdot (Me_I) + k_{II} \cdot (Me_{II}) + k_{III} \cdot (Me_{III}) + \ldots}$$

of at least 7.0 and a heat of nitride formation per gram of nitrogen according to the formula $$H_1^N = \frac{H_{100}^N}{N_{100}} =$$

$$\frac{l_I \cdot h_I^N \cdot (Me_I) + l_{II} \cdot h_{II}^N \cdot (Me_{II}) + l_{III} \cdot h_{III}^N \cdot (Me_{III}) + \ldots}{l_I \cdot (Me_I) + l_{II} \cdot (Me_{II}) + l_{III} \cdot (Me_{III}) + \ldots}$$

of at least 4.25 said alloy having an oxygen equivalent of at least 10 grams of oxygen per 100 grams of alloy according to the formula $$O_{100} = k_I \cdot (Me_I) + k_{II} \cdot (Me_{II}) + k_{III} \cdot (Me_{III})$$

and a nitrogen equivalent of at least 5 grams of nitrogen per 100 grams of alloy according to the formula $$N_{100} = l_I \cdot (Me_I) + l_{II} \cdot (Me_{II}) + l_{III} \cdot (Me_{III})$$

6. An alloy for addition to iron or steel, containing from 2 to 65% of titanium, from 2 to 65% zirconium, silicon not over about 30%, carbon not over about 5%, at least one element of the group consisting of the alkaline earth metals and alkali-metals, the elements of said group consisting of the alkaline earth metals and alkali-metals being in amount sufficient to react with the silicon and leave not over about 10% silicon in active form, an effective amount up to 40% of at least one element of the group consisting of tantalum, uranium, molybdenum, tungsten and manganese, the sum of the titanium and zirconium being sufficient to react with the carbon and leave at least about 10% titanium or zirconium or both in active form, the balance being one or more elements which are not subversive of the reaction characteristics of the alloy, the alloy having an average heat of oxide formation per gram of oxygen according to the formula $$H_1^O = \frac{H_{100}^O}{O_{100}} =$$

$$\frac{k_I \cdot h_I^O \cdot (Me_I) + k_{II} \cdot h_{II}^O \cdot (Me_{II}) + k_{III} \cdot h_{III}^O \cdot (Me_{III}) + \ldots}{k_I \cdot (Me_I) + k_{II} \cdot (Me_{II}) + k_{III} \cdot (Me_{III}) + \ldots}$$

of at least 7.0 and a heat of nitride formation per gram of nitrogen according to the formula $$H_1^N = \frac{H_{100}^N}{N_{100}} =$$

$$\frac{l_I \cdot h_I^N \cdot (Me_I) + l_{II} \cdot h_{II}^N \cdot (Me_{II}) + l_{III} \cdot h_{III}^N \cdot (Me_{III}) + \ldots}{l_I \cdot (Me_I) + l_{II} \cdot (Me_{II}) + l_{III} \cdot (Me_{III}) + \ldots}$$

of at least 4.25 said alloy having an oxygen equivalent of at least 10 grams of oxygen per 100 grams of alloy according to the formula $$O_{100} = k_I \cdot (Me_I) + k_{II} \cdot (Me_{II}) + k_{III} \cdot (Me_{III})$$

and a nitrogen equivalent of at least 5 grams of nitrogen per 100 grams of alloy according to the formula $$N_{100} = l_I \cdot (Me_I) + l_{II} \cdot (Me_{II}) + l_{III} \cdot (Me_{III})$$

7. The process of making steel, which comprises obtaining a sample of steel from a bath of steel, obtaining a standard the physical properties of which are known and has substantially the same chemical composition as the sample except for active nitrogen, testing the sample and standard by means which indicate the relative contents of active nitrogen in the sample and standard as shown by the difference in temperature between the standard and sample while passing through their critical transformation range, and adding to the bath of steel nitrogen deactifying material in accordance with the test to produce steel having the desired physical properties.

8. The process of making steel, which comprises obtaining a sample of steel from a bath of steel, obtaining a standard the physical properties of which are known and has substantially the same chemical composition as the sample except for active nitrogen, testing the sample and standard by means which indicate the relative contents of active nitrogen in the sample and standard as shown by the difference in temperature between the standard and sample while cooling through their critical transformation range, and adding to the bath of steel nitrogen deactifying material in accordance with the test to produce steel having the desired physical properties.

9. The method of testing steel to determine its active nitrogen content relative to a standard of known active nitrogen content, which comprises heating to a temperature above their critical points a sample of the steel to be tested and a standard having substantially the same chemical composition except for active nitrogen, cooling the sample and standard while subjecting them to substantially the same temperatures and observing the difference in temperature between the standard and sample while passing through their critical transformation range.

10. The method of testing steel to determine its active nitrogen content relative to a standard of known active nitrogen content, which comprises subjecting to the same furnace temperature and within their transformation range a sample of the steel to be tested and a standard having substantially the same chemical composition except for active nitrogen, and observing the difference in temperature between the standard and sample at the critical transformation range.

11. The process of making steel, which comprises obtaining a sample of steel from a bath of steel, obtaining a standard the physical properties of which are known, are those desired in the steel being made and has substantially the same chemical composition except for active nitrogen, testing the sample and standard by means which indicate the relative contents of active nitrogen in the sample and standard as shown by the difference in temperature between the standard and sample while in their critical transformation range, and adding to the bath of steel nitrogen deactivating material in amount substantially equivalent to the difference in active nitrogen in the sample and standard as shown by the difference in temperature between the sample and standard, whereby the treated steel has substantially the same physical properties as the standard.

12. The process of making steel, which comprises obtaining a sample from a bath of steel, obtaining a steel to be used as a standard, said standard having a known hardenability and being of substantially the same chemical composition as the sample except for active nitrogen, testing the sample and standard by means which indicate the relative contents of active nitrogen in the sample and standard as shown by the difference in temperature between the standard and sample while in their critical transformation range, and adjusting the active nitrogen content of the steel bath in accordance with the test by adding to the bath nitrogen deactivating material in controlled amount to produce steel of desired hardenability.

13. An alloy for addition to iron or steel, containing about 2 to 40% molybdenum, about 2 to 50% aluminum and about 2 to 65% titanium, the balance being one or more elements which are not subversive of the reaction characteristics of the alloy, the alloy having an average heat of oxide formation per gram of oxygen according to the formula $$H_1^O = \frac{H_{100}^O}{O_{100}} = \frac{k_I \cdot h_I^O \cdot (Me_I) + k_{II} \cdot h_{II}^O \cdot (Me_{II}) + k_{III} \cdot h_{III}^O \cdot (Me_{III}) + \ldots}{k_I \cdot (Me_I) + k_{II} \cdot (Me_{II}) + k_{III} \cdot (Me_{III}) + \ldots}$$

of at least 7.0 and a heat of nitride formation per gram of nitrogen according to the formula $$H_1^N = \frac{H_{100}^N}{N_{100}} = \frac{l_I \cdot h_I^N \cdot (Me_I) + l_{II} \cdot h_{II}^N \cdot (Me_{II}) + l_{III} \cdot h_{III}^N \cdot (Me_{III}) + \ldots}{l_I \cdot (Me_I) + l_{II} \cdot (Me_{II}) + l_{III} \cdot (Me_{III}) + \ldots}$$

of at least 4.25, said alloy having an oxygen equivalent of at least 10 grams of oxygen per 100 grams of alloy according to the formula $$O_{100} = k_I \cdot (Me_I) + k_{II} \cdot (Me_{II}) + k_{III} \cdot (Me_{III})$$

and a nitrogen equivalent of at least 5 grams of nitrogen per 100 grams of alloy according to the formula $$N_{100} = l_I \cdot (Me_I) + l_{II} \cdot (Me_{II}) + l_{III} \cdot (Me_{III})$$

14. An alloy for addition to iron or steel, containing about 2 to 40% molybdenum, about 10 to 30% aluminum and about 10 to 30% titanium, the balance being one or more elements which are not subversive of the reaction characteristics of the alloy in deactivating nitrogen and oxygen.

15. An alloy for addition to iron or steel containing about:

| | Per cent |
|---|---|
| Titanium | 10 to 40 |
| Aluminum | 2 to 50 |
| Zirconium | 2 to 14 |
| Manganese | 5 to 20 | the balance being one or more elements which are not subversive of the reaction characteristics of the alloy in deactivating nitrogen and oxygen.

16. An alloy for addition to iron or steel containing about:

| | Per cent |
|---|---|
| Titanium | 10 to 40 |
| Aluminum | 5 to 30 |
| Zirconium | 2 to 14 |
| Manganese | 5 to 20 | the balance being one or more elements which are not subversive of the reaction characteristics of the alloy in deactivating nitrogen and oxygen.

17. An alloy for addition to iron or steel containing about:

| | Per cent |
|---|---|
| Titanium | 10 to 30 |
| Aluminum | 10 to 30 |
| Zirconium | 2 to 12 |
| Manganese | 5 to 20 | the balance being one or more elements which are not subversive of the reaction characteristics of the alloy in deactivating nitrogen and oxygen.

HENRY T. CHANDLER.